(12) United States Patent
Vanderlaan et al.

(10) Patent No.: US 9,612,363 B2
(45) Date of Patent: Apr. 4, 2017

(54) SILICONE HYDROGEL REACTIVE MIXTURES COMPRISING BORATES

(75) Inventors: Douglas G. Vanderlaan, Jacksonville, FL (US); James D. Ford, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 1075 days.

(21) Appl. No.: 13/282,658

(22) Filed: Oct. 27, 2011

(65) Prior Publication Data

US 2012/0115980 A1   May 10, 2012

Related U.S. Application Data

(60) Provisional application No. 61/410,003, filed on Nov. 4, 2010.

(51) Int. Cl.
| | | |
|---|---|---|
| C08L 83/04 | (2006.01) | |
| G02B 1/04 | (2006.01) | |
| C08G 77/56 | (2006.01) | |
| C08G 77/16 | (2006.01) | |
| C08G 77/20 | (2006.01) | |

(52) U.S. Cl.
CPC ............. *G02B 1/043* (2013.01); *C08G 77/56* (2013.01); *C08L 83/04* (2013.01); *C08G 77/16* (2013.01); *C08G 77/20* (2013.01)

(58) Field of Classification Search
CPC .................. G02B 1/043; C08L 83/04
USPC ....................................................... 523/107
See application file for complete search history.

(56) References Cited

U.S. PATENT DOCUMENTS

| | | | |
|---|---|---|---|
| 4,495,313 A * | 1/1985 | Larsen | 523/106 |
| 4,680,336 A | 7/1987 | Larsen | |
| 4,889,664 A | 12/1989 | Kindt Larsen | |
| 5,039,459 A | 8/1991 | Kindt Larsen | |
| 5,244,981 A | 9/1993 | Seidner | |
| 5,314,960 A | 5/1994 | Spinelli | |
| 5,321,108 A | 6/1994 | Kunzler | |
| 5,331,067 A | 7/1994 | Seidner | |
| 5,371,147 A | 12/1994 | Spinelli | |
| 5,387,662 A | 2/1995 | Kunzler | |
| 5,457,140 A | 10/1995 | Nunez | |
| 5,484,863 A | 1/1996 | Molock et al. | |
| 5,539,016 A | 7/1996 | Kunzler | |
| 5,690,953 A | 11/1997 | Molock et al. | |
| 5,944,853 A | 8/1999 | Molock | |
| 6,020,445 A * | 2/2000 | Vanderlaan et al. | 526/279 |
| 6,342,570 B1 | 1/2002 | Bothe | |
| 6,367,929 B1 | 4/2002 | Maiden | |
| 6,822,016 B2 | 11/2004 | McCabe | |
| 7,052,131 B2 | 5/2006 | McCabe et al. | |
| 7,649,058 B2 | 1/2010 | McCabe et al. | |
| 7,666,921 B2 | 2/2010 | McCabe et al. | |
| 7,691,916 B2 | 4/2010 | McCabe et al. | |
| 8,158,695 B2 | 4/2012 | Vanderlaan | |
| 8,168,720 B2 | 5/2012 | McCabe et al. | |
| 8,431,669 B2 | 4/2013 | McCabe et al. | |
| 8,450,387 B2 | 5/2013 | McCabe et al. | |
| 8,796,353 B2 | 8/2014 | McCabe et al. | |
| 8,895,687 B2 | 11/2014 | McCabe et al. | |
| 2002/0016383 A1 | 2/2002 | Iwata | |
| 2006/0063852 A1 | 3/2006 | Iwata | |

FOREIGN PATENT DOCUMENTS

| | | |
|---|---|---|
| CN | 1218816 A | 6/1999 |
| CN | 101526632 A | 9/2009 |
| EP | 1601723 A2 | 12/2005 |
| RU | 2334770 C1 | 9/2008 |
| WO | WO 9631792 A1 | 10/1996 |
| WO | 9960048 A1 | 11/1999 |
| WO | WO 2004081105 A2 | 9/2004 |

OTHER PUBLICATIONS

International Preliminary Report on Patentability, dated May 7, 2012, for PCT Int'l Appln. No. PCT/US2011/058528.
Czerwinski, et al, Solvent effect on free radical plymerization: 8.* Modelling of copolymerization rate ofr the binary system methylmethacrylate/N-vinyl pyrrolid-2-one in different solvents, Polymer, vol. 37, No. 24, 00. 5545-5546, 1996.
North, et al, Diffusion-Controlled Polymerization of Some Alkyl Methacrylates, Journal of Polymer Science: part A vol. 1, pp. 1311-1321, 1963.
Abadi, "The spectral transmittance of hydrogel contact lens filters." University of Manchester Institute of Science and Technology. Manchester, UK: University of Manchester, 1989. Print.
Flanagan, et al. "Effect of Wavelength on Discomfort Glare From Monochromatic Sources." UMTRI-89-30; The Universit of Michigan. Ann Arbor, MI: Transportation Research Institute, 1989. Print.
Purslow, et al. "Ocular Surface Temperature." Eye & Contact Lens. 31.3 (2005): 117-123. Print.
Wilkins, et al. "Visual stress its treatment with spectral filters and its relationship to visually induced motion sickness." Applied Ergomomics. 41. (2010): 509-515. Print.
Wolffsohn, et al. "Objective clinical performance of 'comfort-enhanced' daily disposable soft contact lenses." Contact Lens & Anterior Eye. 33. (2010): 88-92. Print.
PCT International Search Report, dated Jan. 12, 2012, for PCT Int'l Appln. No. PCT/US2011/058528.

* cited by examiner

Primary Examiner — Michael Pepitone

(57) ABSTRACT

Disclosed in this specification is a method for forming a silicone hydrogel material that is useful for forming contact lens materials. The method includes using an effective amount of a borate additive to reduce the gel time of the silicone hydrogel reactive mixture and/or enhance the optical properties of the resulting cured material.

16 Claims, 5 Drawing Sheets

SILICONE HYDROGEL REACTIVE MIXTURES COMPRISING BORATES

RELATED APPLICATIONS

This application claims priority to U.S. Provisional Application 61/410,003 filed Nov. 4, 2010.

FIELD OF THE INVENTION

This invention relates, in at least one embodiment, to a method of forming a silicone hydrogel contact lens material.

BACKGROUND OF THE INVENTION

Silicone hydrogels are typically formed by curing blends of silicone monomers or macromers and hydrophilic monomers. In many cases, the blends of the desired silicone monomers with hydrophilic monomers are not miscible. The immiscible blends are opaque and cannot be used to form a material suitable for use in a contact lens.

One solution to the problem of immiscible blends involves the use of specialized diluents, including secondary and tertiary alcohols as well diluents which balance solubility and hydrogen bonding parameters.

Previous attempts to address the immiscibility problem rely on compatabilizing otherwise insoluble blends so that optically clear lenses can be formed. These attempts generally do not provide a beneficial effect on other characteristics of the reaction mixture such as viscosity, rate of curing or the mechanical properties of the resulting contact lens.

SUMMARY OF THE INVENTION

The invention comprises, in one form thereof, a method of forming a silicone hydrogel contact lens material by curing a reaction mixture that includes at least one hydrophilic component, at least one silicone component and at least one borate additive. In some cases the addition of a borate additive increases the viscosity of the mixture, or it reduces the gel time needed to cure the mixture while maintaining an optically clear blend.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION OF A PREFERRED EMBODIMENT

Figure 1:
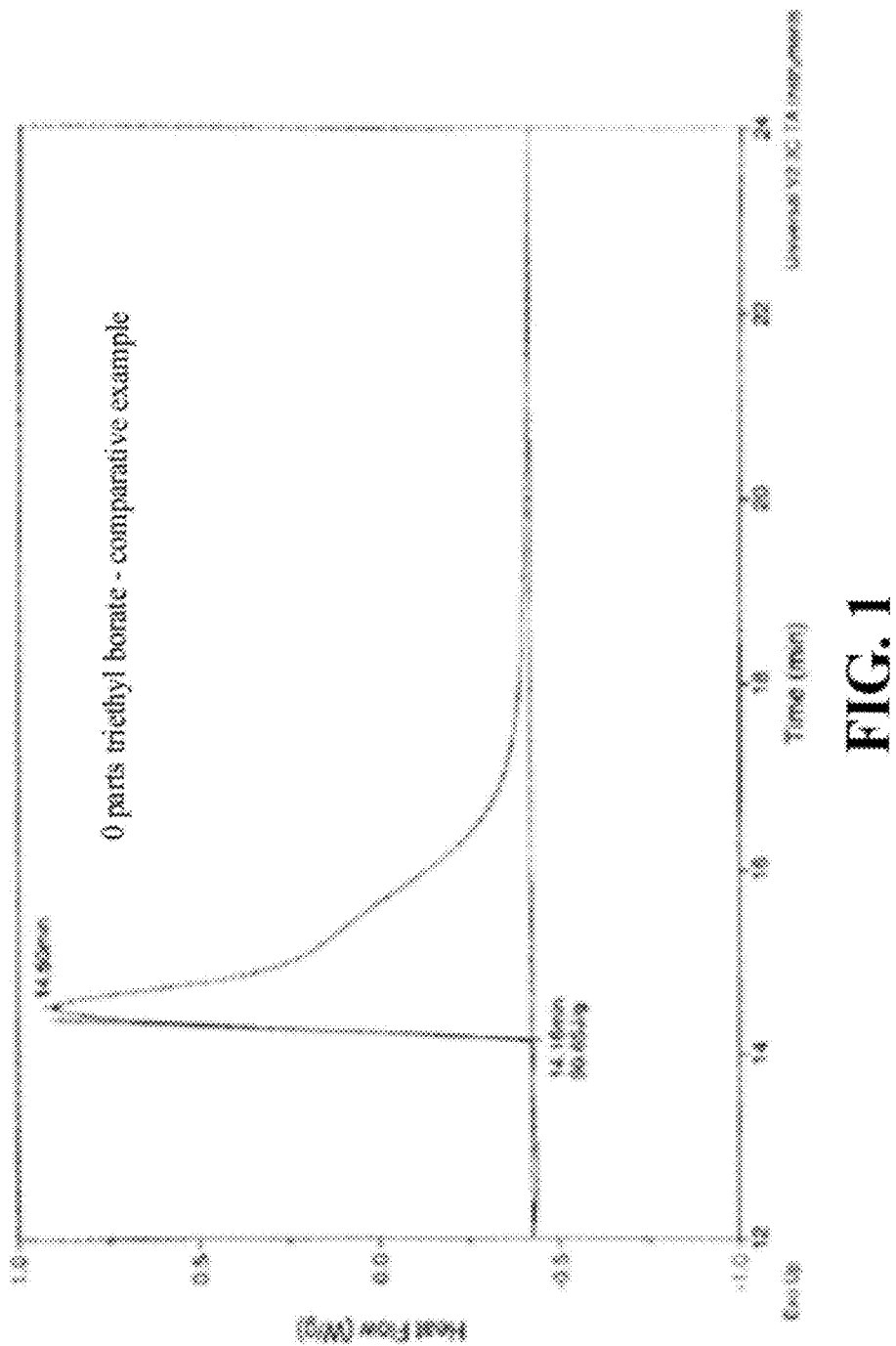
FIG. 1 is a graph showing heat flow from curing a control sample.

The use of borate ester-containing diluents has been described for the formation of convention hydrogels that do not contain silicone. See, for example, U.S. Pat. Nos. 4,889,664 and 5,039,459. However, it has unexpectedly been found that borates can be used in silicone hydrogel precursor mixtures and that such formulations beneficially alter certain properties of the precursor mixtures (viscosity and rate of curing) and the properties of the resulting lenses such as optical clarity.

The invention generally pertains to a method of forming a silicone hydrogel material that includes a polymerizable hydrophilic component, a polymerizable silicone component and an additive with borate ester functionality. At least one of the components includes a hydroxyl group capable of forming a borate ester group.

A "reaction mixture" is the mixture of components, including, reactive components such as monomers and macromer, diluent, initiators, crosslinkers and additives which, when subjected to polymer forming conditions, form a polymer. Reactive components are the components in the reaction mixture, which upon polymerization, become a permanent part of the polymer, either via chemical bonding or entrapment or entanglement within the polymer matrix. For example, reactive components become part of the polymer via polymerization, while polymeric internal wetting agents without polymerizable groups, such as PVP (polyvinyl pyrrolidone), become part of the polymer via entrapment. The diluent and any additional processing aids do not become part of the structure of the polymer and are not part of the reactive components. Such components are removed during the manufacturing process. Applications of such silicone hydrogel materials include contact lenses, bandage lenses, intraocular lenses, as well as a variety of other medical devices.

A hydrogel is a hydrated crosslinked polymeric system that contains water in an equilibrium state. When the hydrogels of the present invention are used to form contact lenses they absorb at least about 10 wt % water.

A "biomedical device" or "medical device" is any article that is designed to be used while either in or on mammalian tissues or fluid. Examples of these devices include but are not limited to wound dressings, catheters, implants, stents, and ophthalmic devices such as intraocular lenses and contact lenses. In one embodiment the biomedical devices are ophthalmic devices, particularly contact lenses, most particularly contact lenses made from silicone hydrogels.

A "contact lens" refers to ophthalmic devices that reside in or on the eye. These devices can provide optical correction, cosmetic enhancement, UV blocking and visible light or glare reduction, therapeutic effect, including wound healing, delivery of drugs or nutraceuticals, diagnostic evaluation or monitoring, or any combination thereof. The term lens includes, but is not limited to, soft contact lenses, hard contact lenses, intraocular lenses, overlay lenses, ocular inserts, and optical inserts.

Polymerizable are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

As used in this specification, the term "(meth)" designates optional methyl substitution. Thus, a term such as "(meth)acrylate" denotes both methacrylic and acrylic radicals.

As used in this specification, the term borate refers to an ester between boric acid and an alcohol, and comprises —B—O—C— structure. The borate does not become a permanent part of the polymeric matrix (e.g. while it may react with hydroxyl containing components in the reactive mixture, the bonds are labile and easily hydrolyzed when the polymer is contacted with water). Instead, the borate group is part of the diluent system and does not become a permanent part of the final lens. The borate is typically removed from the polymerized material prior to commercial use. Examples of borates include borate esters such as trimethyl borate, triethyl borate, tri-n-propyl borate, tri-isopropyl borate, tri-butyl borate, and tri-tert-butyl borate and tri-HEMA borate. Borate esters are generally of the formula:

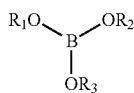

where $R_1$, $R_2$ and $R_3$ are hydrocarbons. In one embodiment, the hydrocarbons are monovalent alkyl or aryl groups. In another embodiment, two of the groups are divalent groups that are covalently bonded to one another, thereby forming a cyclic borate ester. In one embodiment, the three hydrocarbon groups are identical. In another embodiment, the three hydrocarbon groups are independently determined, and thus are not identical. In yet another embodiment, at least one of the hydrocarbon groups is a polymerizable component, for example, if the R group on the borate ester is derived from a hydroxyl-functional reactive monomer like HEMA, which would form mono-, di- or triHEMA borate. In another embodiment R1, R2 and R3 are independently derived from monofunctional alcohols.

In another embodiment, at least one of the hydrocarbons can be one of the polymerizable components used in the formation of the silicone hydrogel. After benefiting from the disclosure contained in this specification, other sources of borates would be readily apparent and are contemplated for use with the present invention. In some embodiments it is desirable to add concentrations of borates which do not result in free borates in the reaction mixture. Thus, in some embodiments suitable amounts of borate may be determined on a molar basis by calculating the molar percentage of hydroxyl groups where the hydrogen has been temporarily replaced with a borate compared to all hydroxyl groups and borate substituted hydroxyls and include from about 5 molar % OH (mole percent —B—O—C— functionality relative to combined —C—O—H and —B—O—C— functionality) to about 100 molar % OH based upon all hydroxyls in the reactive mixture and diluents, and in another embodiment between about 10 and about 80 molar % OH, and in yet another embodiment about 15 to about 70%. The molar % OH needed varies from system to system. Molar % OH should not be so high that the reactive mixture gels prior to polymerization. For example, in systems containing poly-hydroxy macromers such as HFM, with little or no mono-hydroxyl components (such as HEMA), the molar % OH fo 25% caused undesirable gelation. Molar % OH in these systems are accordingly less than about 25 molar % OH and in some embodiments from about 3 to about 20 molar % OH. In systems comprising substantial quantities of mono-hydroxyl components the molar % OH may be as high as 100%. An example of this calculation is included in paragraph [0081] herein.

As used herein, the notation —C—OH or —C—O—H, refers to a hydroxyl group which is attached to a carbon atom in a molecule, and thus, excludes —OH which is part of water. Similarly, —B—O—C— denotes a borate ester group contained within a molecule. Generally, the moles of —B—O—C— functionality per gram of blend are calculated. Similarly, the moles of —C—O—H functionality (including the mmoles of —B—O—C—) per gram of blend are calculated. Dividing the millimoles —B—O— by the combined millimoles —O—H and —B—O—C— ("mmole OH"), and multiplying times 100, provides the molar % OH.

As used in this specification, the phrase "hydrophilic component" refers to a monomer or macromer that, when polymerized with crosslinker, has water content of at least about 10%. Examples of hydrophilic components include HEMA (2-hydroxyethyl methacrylate), DMA (N,N-dimethylacrylamide), GMA(glycerol methacrylate), 2-hydroxyethyl methacrylamide, polyethyleneglycol monomethacrylate, methacrylic acid, acrylic acid, N-vinyl pyrrolidone, N-vinyl-N-methyl acetamide, N-vinyl-N-ethyl acetamide, N-vinyl-N-ethyl formamide, N-vinyl formamide, combinations thereof and the like. Further examples of hydrophilic components are disclosed in U.S. Pat. No. 6,822,016, the content of which is hereby incorporated by reference into this specification. After benefiting from reading this specification, other hydrophilic components would be readily apparent to one skilled in the art and such components are contemplated for use with the present invention. Suitable amounts of hydrophilic component include about 5 to about 80%.

As used in this specification, the phrase "silicone component" refers to a siloxane-containing monomer or macromer. Examples include reactive polydialkylsiloxanes, such as monomethacryloxypropyl terminated mono-C1-C5 alkyl terminated polydimethylsiloxane. Suitable examples include monomethacryloxypropyl terminated mono-methyl terminated polydimethylsiloxane, monomethacryloxypropyl terminated mono-n-butyl terminated polydimethylsiloxane, with a molecular weight from 800-1000 or OH—mPDMS—mono-(3-methacryloxy-2-hydroxypropyloxy) propyl terminated, mono-butyl terminated polydimethylsiloxane)

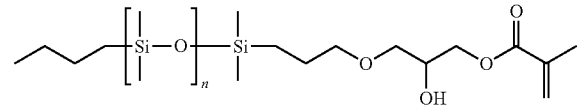

where n is 1-200.
Other examples of silicone components include

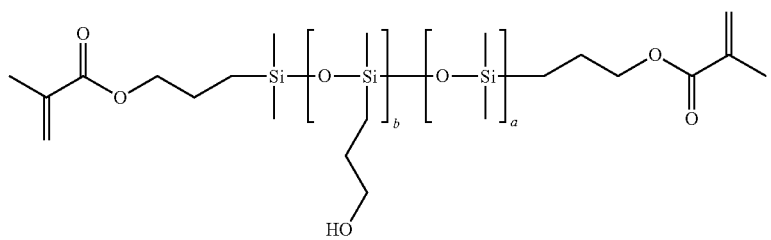

where a is 10-500 and b is 1-150.

Other examples of silicone components include 2-propenoic acid, 2-methyl-,2-hydroxy-3-[3-[1,3,3,3-tetramethyl-1-[(trimethylsilyl)oxy]disiloxanyl]propoxy]propyl ester (SiGMA).

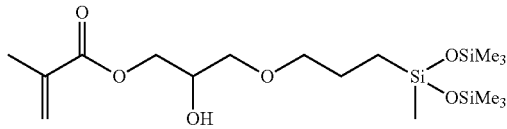

Still other suitable silicone components include compounds of Formula I

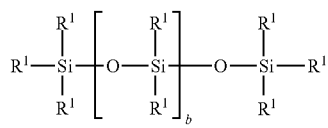

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyhmeth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In another embodiment, one to four $R^1$ comprises a vinyl carbonate or carbamate of the formula:

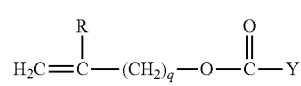

Formula II wherein: Y denotes O—, S— or NH—;
R denotes, hydrogen or methyl; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and Formula III:

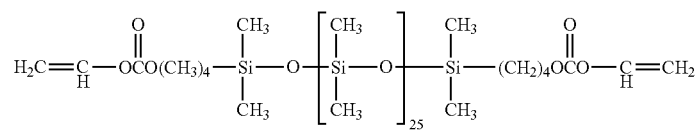

Where biomedical devices with modulus below about 200 are desired, only one $R^1$ shall comprise a monovalent reactive group and no more than two of the remaining $R^1$ groups will comprise monovalent siloxane groups.

In one embodiment, where a silicone hydrogel lens is desired, the lens of the present invention will be made from a reactive mixture comprising at least about 20 weight % and in some embodiments between about 20 and 70% wt silicone-containing components based on total weight of reactive components from which the polymer is made. Another class of silicone-containing components includes polyurethane macromers of the following formulae:

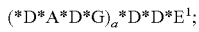

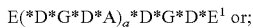

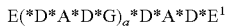

Formulae IV-VI wherein:
D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1;

A denotes a divalent polymeric radical of formula:

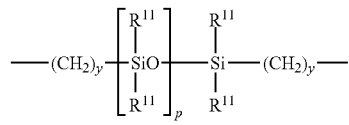

Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

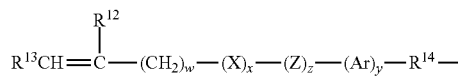

Formula VIII wherein: $R^{12}$ is hydrogen or methyl; $R^{13}$ is hydrogen, an alkyl radical having 1 to 6 carbon atoms, or a —CO—Y— $R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

In one embodiment the silicone-containing component comprises a polyurethane macromer represented by the following formula:

Formula IX

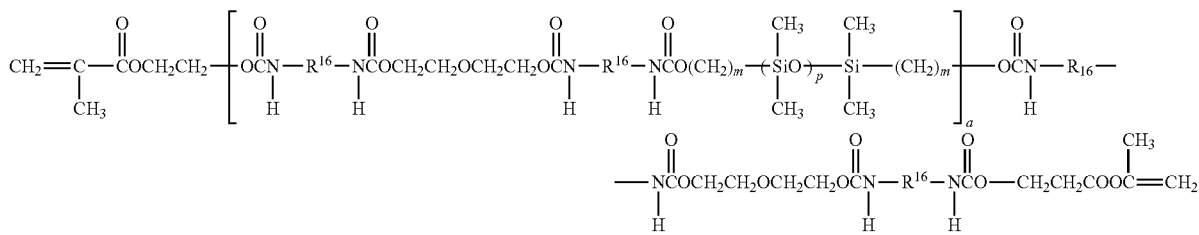

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X

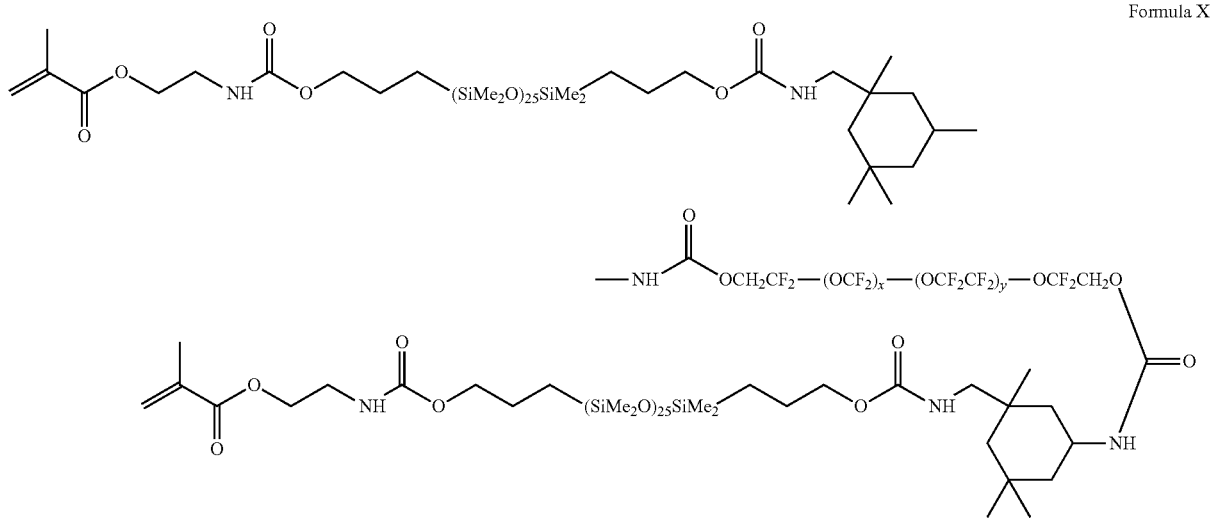

Other silicone-containing components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone containing macromers made via GTP, such as those disclosed in U.S. Pat Nos. 5,314,960, 5,331,067, 5,244,981, 5,371,147 and 6,367,929. U.S. Pat. Nos. 5,321,108; 5,387,662 and 5,539, 016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

After benefiting from reading this specification, other silicone components would be readily apparent to one skilled in the art and such components are contemplated for use with the present invention.

In the mixture of hydrophilic and silicone components, at least one of the components has one or more free hydroxyl groups. In one embodiment, at least one hydrophilic component has at least one hydroxyl group which may be converted to borate ester groups. In another embodiment, at least one silicone component has at least one free hydroxyl group. In yet another embodiment, both a silicone containing component and a hydrophilic component have at least one free hydroxyl group. Due to the presence of at least one free hydroxyl group on the components, the resulting polymer is a polyol that contains multiple free hydroxyl groups.

The reaction mixture may further comprise additional components, including, but not limited to ultra-violet absorbing components, reactive tints, pigments, dyes, photochromic compounds, release agents, wetting agents, nutriceutical compounds, pharmaceutical compounds, combinations thereof and the like. Crosslinkers are compounds with two or more polymerizable functional groups. Examples of crosslinkers that may be used in this invention include TEGDMA (tetraethyleneglycol dimethacrylate), TrEGDMA (triethyleneglycol dimethacrylate), EGDMA (ethyleneglycol dimethacylate), acPDMS, combinations thereof and the like.

The reaction mixtures of the present invention may further comprise at least one initiator. Initiators include compounds such as lauroyl peroxide, benzoyl peroxide, isopropyl percarbonate, azobisisobutyronitrile, and the like, that generates free radicals at moderately elevated temperatures, photoinitiator systems such as an aromatic alpha-hydroxy ketone and a tertiary amine plus a diketone. Illustrative examples of photoinitiator systems are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), and a combination of camphorquinone and ethyl 4-(N,N-dimethylamino)benzoate. The initiator is used in the reaction mixture in catalytically effective amounts, e.g., from about 0.1 to about 2 parts by weight per 100 parts of reactive component. Polymerization of the reaction mixture can be initiated using the appropriate choice of heat or visible or ultraviolet light or other means depending on the polymerization initiator used. Alternatively, initiation can be conducted without a photoinitiator using, for example, low voltage e-beam. However, when a photoinitiator is used, the preferred initiator is a combination of 1-hydroxycyclohexyl phenyl ketone and bis(2,6-dimethoxybenzoyl)-2,4-4-trimethylpentyl phosphine oxide (DMBAPO), and the preferred method of polymerization initiation is visible light.

Diluents useful in preparing the devices of this invention include ethers, esters, alkanes, alkyl halides, silanes and alcohols. In one embodiment the diluents comprise alcohols, and in another secondary and tertiary alcohols. Examples of ethers useful as diluents for this invention include tetrahydrofuran. Examples of esters useful for this invention include ethyl acetate. Examples of alkyl halides useful as diluents for this invention include methylene chloride. Examples of siloxanes useful as diluents for this invention include octamethylcyclotetrasiloxane. Examples of alcohols useful as diluents for this invention include hexanol, heptanol, octanol, nonanol, decanol, tert-butyl alcohol, 3-methyl-3-pentanol, isopropanol, t-amyl alcohol and 3,7-dimethyl-3-octanol. Additional diluents useful for this invention are disclosed in U.S. Pat. No. 6,020,445, which is incorporated herein by reference.

Without wishing to be bound by any particular theory, applicants believe that when a borate diluent is added to a blend which contains at least one other hydroxyl-containing compounds an equilibrium borate transesterification reaction takes place readily so that some fraction of these other hydroxyl-containing compounds form temporary borate esters. This increases the crosslink density of the polymer as it forms, while maintaining an optically clear solution. This is accompanied by an increase in the viscosity of the mixture. An increased crosslink density also results in a reduction in the gel time, which causes an increase in the rate of polymerization (the Trommsdorff effect). Reductions in gel time thus reduce the time to cure. Time to cure may be measured by differential photocalorimetry using the equipment and method described in Example 9 herein. In one embodiment the time to reach 90% cure is less than about 3 minutes and in other embodiments the time to reach 95% cure is less than about 3.6 minutes. In another embodiment the time to reach either 90% or 95% cure is decreased by at least about 10% as compared to a lens formed without including at least one borate. In another embodiment, the time to cure is reduced by at least 20%.

The beneficial effects of borates can be realized in a number of ways. In one embodiment, a borate ester is added to the reaction mixture. In another embodiment, boric acid is added to the reaction mixture. In yet another embodiment, boric anhydride is added. Both boric acid and boric anhydride are believed to form borate esters in situ by undergoing a condensation reaction with the free hydroxyl groups in the components. In some embodiments, it may be advantageous to promote the in situ formation of borate by heating the mixture and/or applying a vacuum to remove the condensation byproduct (e.g. water). Suitable temperatures and pressures for creating the borate esters in situ include from about 25 to about 100° C. and a wide range of pressures.

In yet another embodiment, at least a portion of at least one of the hydroxyl containing components may be "preloaded" by reacting its free hydroxyl groups with a borate compound to preform a borate ester. When the preloaded component is exposed to the other hydroxyl-containing components in the reaction mixture, further borate transesterifications reaction can occur.

Various methods for quantifying the viscosity of a fluid are known in the art. For example, a glass tube viscometer (e.g. Ostwald or Ubbelohde viscometer) may be used. Alternatively, a rotational viscometer, such as the commercially available MERLIN™ or Brookfield viscometers, may be used. In one embodiment, the borate causes at least a 10% increase in viscosity, relative to an identical mixture that lacks the borate. In another embodiment, the borates causes at least a 20% increase in viscosity. In yet another embodiment, at least a 30% increase is caused by the addition of the borate. In still another embodiment, at least is 50% increase in viscosity is observed.

In one embodiment, the invention pertains to an intermediate contact lens material that includes a cured, optically clear contact lens material. The material is the polymerization product of the at least one hydrophilic component and the at least one silicone component, at least one of which has a hydroxyl moiety, which may be part of a borate ester or may exist in —C—O—H form. Also present in the cured material is the residual borate ester discussed elsewhere in this specification. This borate is not permanently incorporated into the polymeric material and, is typically removed from the polymerization product via hydrolysis or extraction. Methods of removing residual compounds from a cured contact lens material are known in the art. For example, the borates may be extracted by washing the material with solvents comprising at least hydroxyl group, such as alcohols, water and mixtures thereof. In one embodiment, where at least one alcohol is used, the alcohol is water soluble. Examples of suitable solvents include water and lower alcohols, such as methanol, ethanol, n-propanol and isopropanol.

The lenses produced according to the above process have material properties that differ from those of a corresponding lens produced without the borate additive. For example, the lenses may be more optically clear. In some embodiments the % haze is less than 100% compared to a CSI lens, and in other embodiments less than about 40%.

Although the above discussion focuses on the use of the material in the field of contact lenses, there are non-contact lens applications for the present invention. By way of illustration, and not limitation, other applications include biomaterial scaffolds, absorbent articles, drug delivery particles, polymers and articles.

These examples do not limit the invention. They are meant only to suggest a method of practicing the invention. Those knowledgeable in contact lenses as well as other specialties may find other methods of practicing the invention. However, those methods are deemed to be within the scope of this invention.

Haze is measured by placing a hydrated test lens in borate buffered saline in a clear 20×40×10 mm glass cell at ambient temperature above a flat black background, illuminating from below with a fiber optic lamp (Titan Tool Supply Co. fiber optic light with 0.5" diameter light guide set at a power setting of 4-5.4) at an angle 66° normal to the lens cell, and capturing an image of the lens from above, normal to the lens cell with a video camera (DVC 1300C:19130 RGB camera with Navitar TV Zoom 7000 zoom lens) placed 14 mm above the lens platform. The background scatter is subtracted from the scatter of the lens by subtracting an image of a blank cell using EPIX XCAP V 1.0 software. The subtracted scattered light image is quantitatively analyzed, by integrating over the central 10 mm of the lens, and then comparing to a −1.00 diopter CSI Thin Lens®, which is arbitrarily set at a haze value of 100, with no lens set as a haze value of 0. Five lenses are analyzed and the results are averaged to generate a haze value as a percentage of the standard CSI lens.

EXAMPLES

Examples 1 through 7, detailed elsewhere in this specification, show an increase in the solution viscosity as additional borate is added.

Examples 8 to 11 show a decrease in the cure time of a silicone hydrogel component mixture as the borate concentration is increased.

Examples 12 to 14 also show a decrease in the cure time of a different silicone hydrogel mixture as borate concentration is increased.

Examples 15 and 16 show that, in some cases, optical properties are enhanced by the addition of the borate additive.

Example 17 shows an increase in miscibility of the blend components caused by the addition of borate. This resulted in lens with improved optical properties.

Examples 18 and 19 quantify the reduction in cure time due to the addition of borate for certain blends.

| Example | mmole OH | µl B(OEt)$_3$ added | mmole BO | % BO/OH | Clarity | Viscosity |
|---|---|---|---|---|---|---|
| 2 (control) | 6.6 | 0 | 0 | 0% | Clear | Low |
| 3 | 7.0 | 25 | 0.43 | 6.1% | Clear | Slightly viscous |
| 4 | 7.5 | 50 | 0.88 | 12% | Clear | Very viscous |
| 5 | 8.4 | 100 | 1.8 | 21% | Clear | Very viscous |
| 6 | 10 | 200 | 3.5 | 35% | Clear | Very viscous |
| 7 | 13 | 375 | 6.5 | 50% | Slightly cloudy | Very viscous |

The term "mmole OH" refers to total moles hydroxyl, in a given reactive mixture, including hydroxyl groups that are free, and those that are incorporated into a borate ester. So in the above calculation, the mmole OH may be calculated as follows. First the moles of OH in the silicone, diluent and hydrophilic components are calculated. The silicone component is the macromer formed in Example 1. The molecular weight of the macromer of Example 1 is 13,550 g per mole. It has 30 OH groups per mole, thus:

$$\left(\frac{13550 \text{ g macromer}}{\text{mole macromer}}\right)\left(\frac{1 \text{ mole macromer}}{30 \text{ mole OH}}\right)\left(\frac{1000 \text{ mg}}{\text{g}}\right)\left(\frac{1 \text{ mole}}{1000 \text{ mmole}}\right) = \frac{452 \text{ mg macromer}}{\text{mmole OH}}$$

The blend (5 g in Examples 2-7) which does not contain any diluent, before addition of borate contains 60% macromer, thus:

$$\left(\frac{5 \text{ g blend}}{1}\right)\left(\frac{1000 \text{ mg}}{1 \text{ g}}\right)\left(\frac{60 \text{ g macromer}}{100 \text{ g blend}}\right)\left(\frac{\text{mmole OH}}{452 \text{ mg macromer}}\right) = \frac{6.6 \text{ mmoles OH}}{1}$$

However, additional hydroxyl groups (in the form of borate esters) are added with the B(OEt)$_3$. This additional amount of OH is the same as the mmolar quantity of BO groups shown in the examples. The mmole OH column is the sum of these two hydroxyl sources. Further details are provided with the corresponding example.

In the examples that follow, certain abbreviations are used.

| | |
|---|---|
| OH-mPDMS | mono-(3-methacryloxy-2-hydroxypropyloxy)propyl terminated, mono-butyl terminated polydimethylsiloxane (MW 612 g/mole) |
| mPDMS | mono-3-methacryloxypropyl terminated, mono-butyl terminated polydimethylsiloxane (MW 1000 g/mole) |
| SiGMA | 2-propenoic acid, 2-methyl-,2-hydroxy-3-[3-[1,3,3,3-tetramethyl-1-[(trimethylsilyl)oxy]disiloxanyl]propoxy]propyl ester |
| DMA | N,N-dimethylacrylamide |
| HEMA | 2-hydroxyethyl methacrylate |
| HEAA | 2-hydroxyethyl acrylamide |
| GMA | Glycerine mono-methacrylate |
| TEGDMA | tetraethyleneglycol dimethacrylate |
| Norbloc | 2-(2'-hydroxy-5-methacryloxyethylphenyl)2H-benzotriazole |
| PVP K-90 | polyvinyl pyrrolidone |
| PAGMBE | polyoxyalkyleneglycol derivatives sold as Unilube 50MB-5 by NOF Corporation |
| CGI-819 | bis(2,4,6-trimethylbenzoyl)-phenylphosphineoxide |
| Darocur 1173 | 2-hydroxy-2-methylpropiophenone |
| Blue Hema | the reaction product of Reactive Blue 4 and HEMA, as described in Example 4 of U.S. Pat. No. 5,944,853 |
| TAA | Tert-amyl alcohol |
| TPME | tri(propylene glycol) methyl ether |
| D3O | 3,7-dimethyl-3-octanol |

Example 1

Preparation of HFM 30:30 Macromer

A sample of 50 g octamethylcyclotetrasiloxane was combined with 9.36 g of 1,3,5,7-tetramethylcyclotetrasiloxane, 1.96 g 1,3-bis(3-methacryloxypropyl)tetramethyldisiloxane, 70 g dichloromethane and 0.5 g trifluoromethanesulfonic acid in a round bottomed flask. This mixture was stirred under nitrogen at room temperature for about 24 hours. The mixture was washed with 75 ml saturated aqueous sodium carbonate. The bottom layer was washed with about 75 ml of water and dried over sodium sulfate. The mixture was filtered through Celite and the solvent was removed under reduced pressure to give an intermediate product as a clear oil.

To 98 g of this intermediate was added 0.02 g of 2,6-di-tert-butyl-4-methylphenol (BHT), 0.04 g potassium acetate, 100 mg of a 10% (wt) solution of chloroplatinic acid in isopropanol, 18.1 g allyl alcohol and about 100 g isopropanol. This mixture was heated under nitrogen to 50° C. for three hours. The mixture was cooled and filtered through Celite. The solvent was removed under reduced pressure at about 8 Torr for about 3 hours to yield the product (HFM 130:30) as a clear oil.

Example 2

Control—0 M % OH Borate

A blend was made of 60 parts by weight HFM 130:30 (see Example 1) and 40 parts N,N-dimethylacrylamide (DMA) with 0.23 parts CGI 819 (bis(2,4,6-trimethylbenzoyl)-phenylphosphineoxide). A 5 g portion was stirred and its viscosity was visually observed. The mixture was deemed to have low viscosity and a clear appearance.

Example 3

6 M % OH Borate

A 5 g portion of a blend was prepared in accordance with Example 2. To this mixture was added 25 μL triethyl borate (0.15 mmoles, 0.02145 g). The resulting mixture was deemed to be slightly more viscous than the control of Example 2. The mixture formed a white precipitate upon addition of the borate but the precipitate gradually disappeared with stirring.

Triethyl borate introduces 20.5 mmoles of OH functionality per gram.

$$\left(\frac{\text{mole B(OEt)}_3}{145.99 \text{ g B(OEt)}_3}\right)\left(\frac{3 \text{ mole OH}}{1 \text{ mole B(OEt)}_3}\right)\left(\frac{1000 \text{ mmoles}}{\text{mole}}\right) = \frac{20.5 \text{ mmoles OH}}{\text{g B(OEt)}_3}$$

Similar calculations for blends using the HFM (130:30) of Example 1 shows the blend provides 2.21 mmole OH per gram. Analogous methods show triethyl borate can provide 20.5 borate functionality (B—O bonds) per gram.

The mmoles of OH from a component per gram of blend can then be determined. The following calculation determines the mmol OH from triethyl borate, but HFM 130:30 can also be determined in a similar fashion.

$$\left(\frac{20.5 \text{ mmoles OH}}{\text{g B(OEt)}_3}\right)\left(\frac{0.858 \text{ g B(OEt)}_3}{\text{mL B(OEt)}_3}\right)\left(\frac{1 \text{ mL}}{1000 \text{ μL}}\right)\left(\frac{25 \text{ μL B(OEt)}_3}{1}\right)$$
$$\left(\frac{1}{5 \text{ g blend}}\right) = \left(\frac{0.09 \text{ mmoles OH from B(OEt)}_3}{1 \text{ g blend}}\right)$$

The resulting blend is therefore 6 molar % OH, measured relative to the hydroxyl functionality. The results are summarized in Table 1.

$$\frac{0.09 \text{ mmole B—O/g blend}}{1.41 \text{ mmole OH/g blend}} = 6M \% \text{ OH}$$

TABLE 1

Composition of Example 3

| | g/g of blend | mmole OH/g comp. | mmole B—O/g component | mmole OH/g blend | mmole B—O/g blend |
|---|---|---|---|---|---|
| HFM 130:30 | 0.6 | 2.21 | 0 | 1.33 | 0.00 |
| DMA | 0.4 | 0 | 0 | 0.00 | 0.00 |
| triethyl borate | 0.0042 | 20.5 | 20.5 | 0.09 | 0.09 |
| Total | | | | 1.41 | 0.09 (6.1M % OH) |

Example 4

12 M % OH Borate

A 5 g portion of a blend was prepared in accordance with Example 2. To this mixture was added 50 μL triethyl borate (0.30 mmoles). The resulting mixture was deemed to be significantly more viscous than the control of Example 2. The mixture formed a white precipitate upon addition of the borate but the precipitate gradually disappeared with stirring.

TABLE 2

Composition of Example 4

| | g/g of blend | mmole OH/g comp. | mmole B—O/g component | mmole OH/g blend | mmole B—O/g blend |
|---|---|---|---|---|---|
| HFM 130: 30 | 0.59 | 2.21 | 0 | 1.30 | 0.00 |
| DMA | 0.4 | 0 | 0 | 0.00 | 0.00 |
| triethyl borate | 0.0085 | 20.5 | 20.5 | 0.17 | 0.17 |
| Total | | | | 1.48 | 0.17 (11.8M % OH) |

Example 5

21 M % OH Borate

A 5 g portion of a blend was prepared in accordance with Example 2. To this mixture was added 100 μL triethyl borate (0.60 mmoles). The resulting mixture was deemed to be significantly more viscous than the control of Example 2. The mixture formed a white precipitate upon addition of the borate but the precipitate gradually disappeared with stirring.

TABLE 3

Composition of Example 5

| | g/g of blend | mmole OH/g comp. | mmole B—O/g component | mmole OH/g blend | mmole B—O/g blend |
|---|---|---|---|---|---|
| HFM 130: 30 | 0.59 | 2.21 | 0 | 1.30 | 0.00 |
| DMA | 0.39 | 0 | 0 | 0.00 | 0.00 |
| triethyl borate | 0.017 | 20.5 | 20.5 | 0.35 | 0.35 |
| Total | | | | 1.65 | 0.35 (21.1M % OH) |

Example 6

34 M % OH Borate

A 5 g portion of a blend was prepared in accordance with Example 2. To this mixture was added 200 μL triethyl borate (1.20 mmoles). The resulting mixture was deemed to be significantly more viscous than the control of Example 2. The mixture formed a white precipitate upon addition of the borate but the precipitate gradually disappeared with stirring.

TABLE 4

Composition of Example 6

| | g/g of blend | mmole OH/g comp. | mmole B—O/g component | mmole OH/g blend | mmole B—O/g blend |
|---|---|---|---|---|---|
| HFM 130:30 | 0.58 | 2.21 | 0 | 1.28 | 0.00 |
| DMA | 0.39 | 0 | 0 | 0.00 | 0.00 |
| triethyl borate | 0.033 | 20.5 | 20 | 0.68 | 0.66 |
| Total | | | | 1.96 | 0.66 (33.7M % OH) |

Example 7

50 M % OH Borate

A 5 g portion of a blend was prepared in accordance with Example 2. To this mixture was added 375 μL triethyl borate (2.20 mmoles). The resulting mixture was deemed to be significantly more viscous than the control of Example 2. The mixture formed a white precipitate upon addition of the borate but the precipitate gradually diminished with stirring. The mixture remained slightly cloudy.

TABLE 5

Composition of Example 6

| | g/g of blend | mmole OH/g comp. | mmole B—O/g component | mmole OH/g blend | mmole B—O/g blend |
|---|---|---|---|---|---|
| HFM 130:30 | 0.56 | 2.21 | 0 | 1.24 | 0.00 |
| DMA | 0.38 | 0 | 0 | 0.00 | 0.00 |
| triethyl borate | 0.06 | 20.5 | 20.5 | 1.23 | 1.23 |
| Total | | | | 2.47 | 1.23 (49.8M % OH) |

Example 8

Preparation of Blend

A blend was made as shown in Table 6

TABLE 6

| Component | Weight percent |
|---|---|
| HFM 130:30 (Example 1) | 32.27% |
| OH-mPDMS | 30.97% |
| DMA | 10.00% |
| HEMA | 14.06% |
| TEGDMA | 0.51% |
| Norbloc | 1.20% |
| PVP K-90 | 10.99% |

To this blend of components was added enough PAGMBE diluent such that the ratio of components to diluent was 90:10 by weight. To this mixture was added 0.039 parts by weight CGI-819 per 100 parts blend. Portions of this blend were used in Examples 9 and 10.

Example 9

Control—0 molar % OH Borate

A portion of the blend from Example 8 was maintained without the addition of a borate additive for comparison purposes. The kinetics of the photocure was evaluated using a TA Instruments 2920 Thermal Analysis Differential Scanning calorimeter (DSC) equipped with a mercury vapor lamp with a radiant intensity (after passing through a blue-violet glass filter and a red-absorbing glass filter, both from Melles Griot) of about 2 mW/cm$^2$, a combination of visible and UV light.

About 10 mg of the sample was placed into an aluminum pan which was placed into the DSC. The chamber was purged with nitrogen for five minutes. The sample temperature was increased to 70° C. After a five minute hold period the sample was irradiated and the heat generated was measured as a function of time. The results are shown in FIG. 1.

Example 10

1.2 parts triethyl borate was added to 100 parts of the blend from Example 8. Upon addition, a white precipitate formed. The resulting mixture was stirred and allowed to stand overnight until it became optically clear. The mixture maintained a higher viscosity relative to the control of Example 9.

Figure 2:
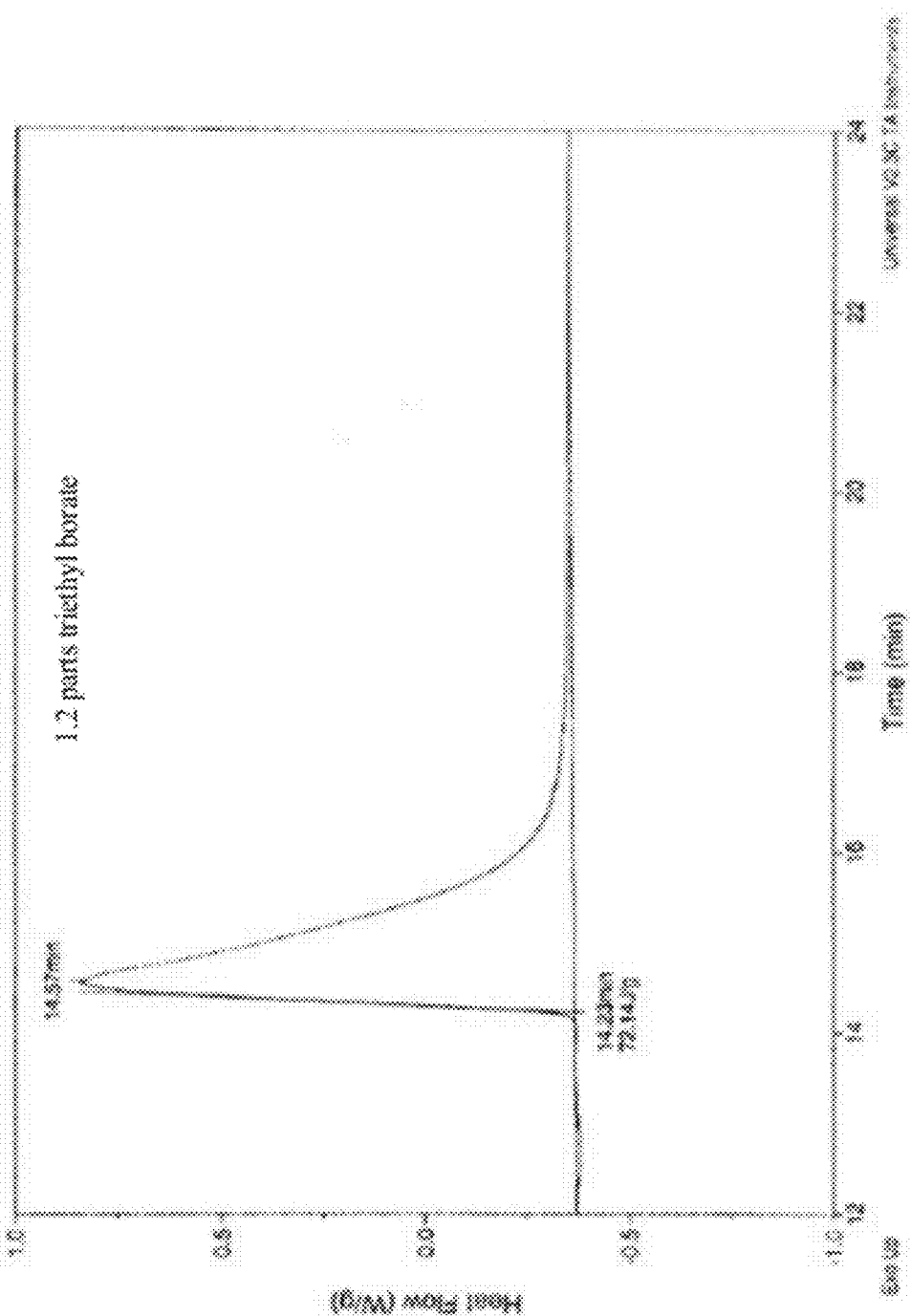
FIG. 2 is a graph showing heat flow from curing a borate-treated sample.

The kinetics of the photocure were evaluated in accordance with the procedure described in Example 9. The results in FIG. 2 showed a reduced "tail", i.e. the mixture reached complete cure more quickly than the blend without borate.

Example 11

Preparation of Blend

A blend was made as shown in Table 7.

TABLE 7

| Component | Weight percent |
| --- | --- |
| OH-mPDMS | 55.00% |
| DMA | 19.53% |
| PVP K-90 | 12.00% |
| HEMA | 8.00% |
| TEGDMA | 3.00% |
| Norbloc | 2.20% |
| CGI 819 | 0.25% |
| Blue HEMA | 0.02% |

The components above (55 parts) was added with 45 parts of a diluent (TPME). The blend had the following properties (0 M % OH borate).

TABLE 8

| | g/g of blend | mmole OH/g comp. | mmole B—O/g comp. | mmole OH/g blend | mmole B—O/g blend |
| --- | --- | --- | --- | --- | --- |
| OH-mPDMS | 0.3 | 1.63 | 0 | 0.49 | 0.00 |
| DMA | 0.11 | 0 | 0 | 0.00 | 0.00 |
| HEMA | 0.044 | 7.7 | 0 | 0.34 | 0.00 |
| TEGDMA | 0.017 | 0 | 0 | 0.00 | 0.00 |
| Blue HEMA | 0.0001 | 0 | 0 | 0.00 | 0.00 |
| Norbloc | 0.012 | 0 | 0 | 0.00 | 0.00 |
| PVP K-90 | 0.066 | 0 | 0 | 0.00 | 0.00 |
| TPME | 0.45 | 4.85 | 0 | 2.18 | 0.00 |
| triethyl borate | 0 | 20.5 | 20.5 | 0.00 | 0.00 |
| Total | 0.9991 | | | 3.01 | 0.00 (0M % OH) |

Example 12

22.6 molar % OH

Figure 3:
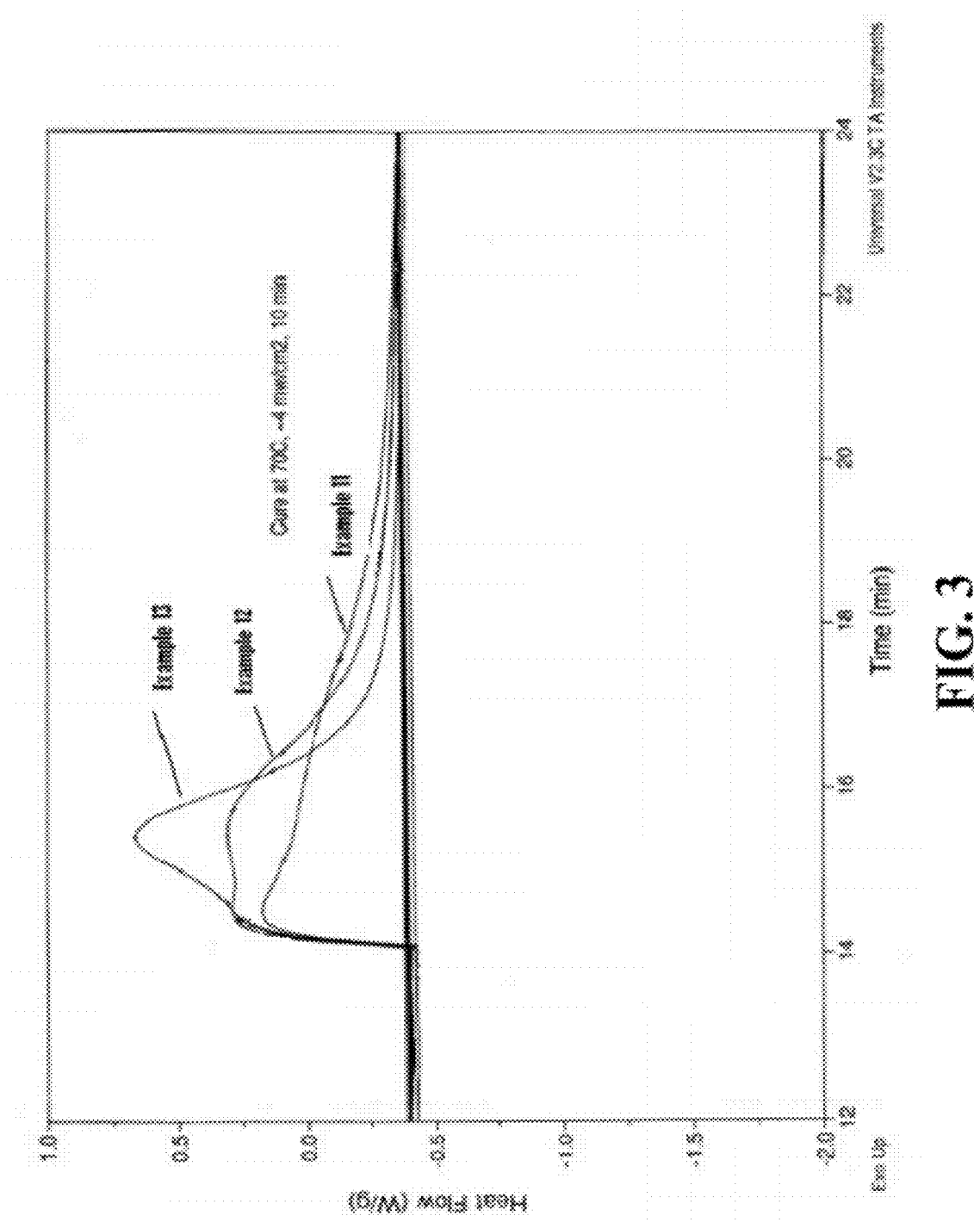
FIG. 3 is a graph showing heat flows for examples 11 to 13.

Using the blend of Example 11, 55 parts of the components was added with 45 parts of a diluent made from 91% (wt) TPME and 8.9% triethyl borate. The resulting mixture was degassed by applying 40 mm Hg vacuum for 15 minutes. Lenses were made by irradiating the mixture for 15 minutes at about 1.3 mW/cm² using Philips TL 20 W/0.3 T fluorescent bulbs at 60° C. in plastic lens molds in a nitrogen environment. The kinetics of the photocure were evaluated in accordance with the procedure described in Example 9 except in that the irradiation took place at 4 mW/cm². The results in FIG. 3 showed that addition of borate reduced the time to complete cure as compared to the same blend without borate. Table 9 shows the calculations of grams component/gram blend, mmol OH/g component, mmol B—O/g component, mmol OH/gm blend and mmol B—O/gm blend. The molar % OH is 22.6% and was calculated by dividing the total mmol —B—O—C— from the last column, by the total mmol OH in the second to last column.

TABLE 9

| | g/g of blend | mmole OH/g comp. | mmole B—O/g comp. | mmole OH/g blend | mmole B—O/g blend |
| --- | --- | --- | --- | --- | --- |
| OH-mPDMS | 0.3 | 1.63 | 0 | 0.49 | 0.00 |
| DMA | 0.11 | 0 | 0 | 0.00 | 0.00 |
| HEMA | 0.044 | 7.7 | 0 | 0.34 | 0.00 |
| TEGDMA | 0.017 | 0 | 0 | 0.00 | 0.00 |
| Blue HEMA | 0.0001 | 0 | 0 | 0.00 | 0.00 |
| Norbloc | 0.012 | 0 | 0 | 0.00 | 0.00 |
| PVP K-90 | 0.066 | 0 | 0 | 0.00 | 0.00 |
| TPME | 0.41 | 4.85 | 0 | 1.99 | 0.00 |
| triethyl borate | 0.04 | 20.5 | 20.5 | 0.82 | 0.82 |
| Total | 0.9991 | | | 3.64 | 0.82 |

Example 13

47.7 M % OH Borate

Example 14 was substantially identical to Example 12 except in that the diluent was made from 76% (wt) TPME and 24% (wt) triethylborate.

The kinetics of the photocure were evaluated in accordance with the procedure described in Example 9 except in that the irradiation took place at 4 mW/cm².

The results in FIG. 3 showed that addition of borate reduced the time to complete cure as compared to the same blend without borate. The calculations of grams component/gram blend, mmol OH/g component, mmol B—O/g component, mmol OH/gm blend and mmol B—O/gm blend are shown in Table 10. The molar % OH is 47.7%

TABLE 10

| | g/g of blend | mmole OH/g comp. | mmole B—O/g comp. | mmole OH/g blend | mmole B—O/g blend |
| --- | --- | --- | --- | --- | --- |
| OH-mPDMS | 0.3 | 1.63 | 0 | 0.49 | 0.00 |
| DMA | 0.11 | 0 | 0 | 0.00 | 0.00 |
| HEMA | 0.044 | 7.7 | 0 | 0.34 | 0.00 |
| TEGDMA | 0.017 | 0 | 0 | 0.00 | 0.00 |
| Blue HEMA | 0.0001 | 0 | 0 | 0.00 | 0.00 |
| Norbloc | 0.012 | 0 | 0 | 0.00 | 0.00 |
| PVP K-90 | 0.066 | 0 | 0 | 0.00 | 0.00 |
| TPME | 0.34 | 4.85 | 0 | 1.65 | 0.00 |
| triethyl borate | 0.11 | 20.5 | 20.5 | 2.26 | 2.26 |
| Total | 0.9991 | | | 4.73 | 2.26 |

Examples 15 and 16

GMA-Borate—Improved Blend Miscibility

Two blends were prepared, as shown in Table 11, one using GMA (Example 15) and the other using GMA-borate (Example 16). The GMA-borate was made by combining 292 wt. parts triethylborate (Aldrich) and 380 parts GMA (a 2 to 3 mole ratio, respectively) and removing the resulting ethanol using a rotary evaporator at 50° C. under high vacuum for 1 hour, or to constant mass, to yield a new compound, GMA-borate. The blend using GMA-borate was filtered through glass wool to remove observed small amount of precipitate that formed in this formulation.

TABLE 11

GMA/GMA-Borate Blends

| Components | Example 15 (wt %) | Example 16 (wt %) |
|---|---|---|
| GMA | 20 | 0 |
| GMA-Borate | 0 | 20 |
| TRIS | 40 | 40 |
| DMA | 6.7 | 6.7 |
| TAA | 33 | 33 |
| Darocur 1173 | 0.3 | 0.3 |
| M % OH | 0% | 38.6% |

Nitrogen was bubbled through each blend for 5 minutes, and the samples were allowed to sit open in a glove box with a nitrogen atmosphere for 2 hours. Plastic molds were filled in the glove box and placed about 3 inches under Philips TL09 20 W bulbs. The lenses were cured in a nitrogen atmosphere at room temperature for 30 minutes. The lenses were then leached, first, in a 50% isopropanol: 50% borate buffered saline solution for 30 minutes, then in three cycles of 100% isopropanol for 30 minutes each, next in 50% isopropanol: 50% borate buffered saline solution for 30 minutes, and lastly, in 3 cycles of 100% borate buffered saline solution for 30 minutes each. The lenses from Example 15 (which lacked borate) were white and the lenses from Example 16 (which included the borate additive) were clear. The calculations of grams component/gram blend, mmol OH/g component, mmol B—O/g component, mmol OH/gm blend and mmol B—O/gm blend are shown in Tables 12 and 13. The molar % OH are 0% for Example 15 and 38.4% for Example 16.

TABLE 12

| | Example 15 | | | | |
|---|---|---|---|---|---|
| | g/g of blend | mmole OH/g comp. | mmole B—O/g comp. | mmole OH/g blend | mmole B—O/g blend |
| GMA | 0.2 | 12.5 | 0 | 2.50 | 0.00 |
| GMA-borate | 0 | 11.8 | 11.8 | 0.00 | 0.00 |
| TRIS | 0.4 | 0 | 0 | 0.00 | 0.00 |
| DMA | 0.067 | 0 | 0 | 0.00 | 0.00 |
| TAA | 0.33 | 11.4 | 0 | 3.76 | 0.00 |
| Darocure 1173 | 0.003 | 6.1 | 0 | 0.02 | 0.00 |
| Total | 1 | | | 6.28 | 0.00 |

TABLE 13

| | Example 16 | | | | |
|---|---|---|---|---|---|
| | g/g in blend | mmole OH/g | mmole B—O/g | mmole OH/g blend | mmole B—O/g blend |
| GMA | 0 | 12.5 | 0 | 0.00 | 0.00 |
| GMA-borate | 0.2 | 11.8 | 11.8 | 2.36 | 2.36 |
| TRIS | 0.4 | 0 | 0 | 0.00 | 0.00 |
| DMA | 0.067 | 0 | 0 | 0.00 | 0.00 |
| TAA | 0.33 | 11.4 | 0 | 3.76 | 0.00 |
| Darocure 1173 | 0.003 | 6.1 | 0 | 0.02 | 0.00 |
| Total | 1 | | | 6.14 | 2.36 |

Examples 17-25

HEAA-Borate—Improved Miscibility by Reducing the Amount of Diluent Needed for a Clear Lens HEAA-borate was made by combining three moles HEAA with one mole triethylborate. Ethanol was removed using a rotary evaporator at 50° C. under high vacuum for 1 hour, or to constant mass, to yield a new compound, HEAA-borate. Various blends were prepared as shown in Table 14.

TABLE 14

HEAA and HEAA-Borate Blends

| Components | Ex 17 (wt %) | Ex 18 (wt %) | Ex 19 (wt %) | Ex. 20 (wt %) | Ex. 21 (wt %) | Ex. 22 (wt %) | Ex. 23 (wt %) | Ex 24 (wt %) | Ex. 25 (wt %) |
|---|---|---|---|---|---|---|---|---|---|
| HEAA | 39.5 | 35.5 | 31.5 | 27.5 | 0.0 | 0.0 | 0.0 | 0.0 | 0.0 |
| HEAA-Borate | 0.0 | 0.0 | 0.0 | 0.0 | 39.5 | 37.5 | 35.5 | 31.5 | 27.5 |
| SiGMA | 59.2 | 53.2 | 47.2 | 41.2 | 59.2 | 56.2 | 53.2 | 47.2 | 41.2 |
| TAA | 0 | 10 | 20 | 30 | 0 | 5 | 10 | 20 | 30 |
| EGDMA | 1 | 1 | 1 | 1 | 1 | 1 | 1 | 1 | 1 |
| Darocur1173 | 0.3 | 0.3 | 0.3 | 0.3 | 0.3 | 0.3 | 0.3 | 0.3 | 0.3 |
| M % OH | 0% | 0% | 0% | 0% | 70.4% | 62.6% | 55.6% | 44.1% | 34.8% |
| Blend Miscible | No | Yes | Yes | Yes | Yes | Yes | Yes | Yes | Yes |
| Lens Clarity | N/A | White | Clear | Clear | White | Slight Haze | Clear | Clear | Clear |

The HEAA and HEAA-borate blends, were degassed in a vacuum desiccator at 40 mbar for approximately 30 minutes. Plastic molds were filled in the glove box and placed about 3 inches under Philips TL09 20 W bulbs. The lenses were cured in a nitrogen atmosphere at room temperature for 30 minutes. The lenses were leached, first, in a 50% isopropanol: 50% borate buffered saline solution for 30 minutes, then in three cycles of 100% isopropanol for 30 minutes each, next in 50% isopropanol: 50% borate buffered saline solution for 30 minutes, and lastly, in 3 cycles of 100% borate buffered saline solution for 30 minutes each. The clarity of the blends and lenses are described in Table 14. Example 17 (which lacks borate) was not miscible, and no lenses were made from the blend of Example 17. The corresponding borate blend (Example 25) was miscible. Example 18 (lacking borate) formed a white lens, whereas the corresponding borate blend (Example 23) formed a clear lens. The calculations of grams component/gram blend, mmol OH/g component, mmol B—O/g component, mmol OH/gm blend and mmol B—O/gm blend. The molar % OH for Examples 17-20 are 0. The molar % OH for Examples 21—are 70%, 62.2%, 62.2%, 43.8% and 34.6% respectively.

TABLE 15

Example 17

|  | g/g in blend | mmole OH/g comp. | mmole B—O/g comp. | mmole OH/g blend | mmole B—O/g blend |
| --- | --- | --- | --- | --- | --- |
| HEAA | 0.395 | 8.7 | 0 | 3.44 | 0.00 |
| HEAA-borate | 0 | 8.5 | 8.5 | 0.00 | 0.00 |
| SiGMA | 0.592 | 2.4 | 0 | 1.42 | 0.00 |
| EGDMA | 0.01 | 0 | 0 | 0.00 | 0.00 |
| TAA | 0 | 11.4 | 0 | 0.00 | 0.00 |
| Darocure 1173 | 0.003 | 6.1 | 0 | 0.02 | 0.00 |
| Total | 1 |  |  | 4.88 | 0.00 |

TABLE 16

Example 18

|  | g/g in blend | mmole OH/g comp. | mmole B—O/g comp. | mmole OH/g blend | mmole B—O/g blend |
| --- | --- | --- | --- | --- | --- |
| HEAA | 0.355 | 8.7 | 0 | 3.09 | 0.00 |
| HEAA-borate | 0 | 8.5 | 8.5 | 0.00 | 0.00 |
| SiGMA | 0.532 | 2.4 | 0 | 1.28 | 0.00 |
| EGDMA | 0.01 | 0 | 0 | 0.00 | 0.00 |
| TAA | 0.1 | 11.4 | 0 | 1.14 | 0.00 |
| Darocure 1173 | 0.003 | 6.1 | 0 | 0.02 | 0.00 |
| Total | 1 |  |  | 5.52 | 0.00 |

TABLE 17

Example 19

|  | g/g in blend | mmole OH/g comp. | mmole B—O/g comp. | mmole OH/g blend | mmole B—O/g blend |
| --- | --- | --- | --- | --- | --- |
| HEAA | 0.315 | 8.7 | 0 | 2.74 | 0.00 |
| HEAA-borate | 0 | 8.5 | 8.5 | 0.00 | 0.00 |
| SiGMA | 0.472 | 2.4 | 0 | 1.13 | 0.00 |
| EGDMA | 0.01 | 0 | 0 | 0.00 | 0.00 |
| TAA | 0.2 | 11.4 | 0 | 2.28 | 0.00 |

TABLE 17-continued

Example 19

|  | g/g in blend | mmole OH/g comp. | mmole B—O/g comp. | mmole OH/g blend | mmole B—O/g blend |
| --- | --- | --- | --- | --- | --- |
| Darocure 1173 | 0.003 | 6.1 | 0 | 0.02 | 0.00 |
| Total | 1 |  |  | 6.17 | 0.00 |

TABLE 18

Example 20

|  | g/g in blend | mmole OH/g comp. | mmole B—O/g comp. | mmole OH/g blend | mmole B—O/g blend |
| --- | --- | --- | --- | --- | --- |
| HEAA | 0.275 | 8.7 | 0 | 2.39 | 0.00 |
| HEAA-borate | 0 | 8.5 | 8.5 | 0.00 | 0.00 |
| SiGMA | 0.412 | 2.4 | 0 | 0.99 | 0.00 |
| EGDMA | 0.01 | 0 | 0 | 0.00 | 0.00 |
| TAA | 0.3 | 11.4 | 0 | 3.42 | 0.00 |
| Darocure 1173 | 0.003 | 6.1 | 0 | 0.02 | 0.00 |
| Total | 1 |  |  | 6.82 | 0.00 |

TABLE 19

Example 21

|  | g/g in blend | mmole OH/g comp. | mmole B—O/g comp. | mmole OH/g blend | mmole B—O/g blend |
| --- | --- | --- | --- | --- | --- |
| HEAA | 0 | 8.7 | 0 | 0.00 | 0.00 |
| HEAA-borate | 0.395 | 8.5 | 8.5 | 3.36 | 3.36 |
| SiGMA | 0.592 | 2.4 | 0 | 1.42 | 0.00 |
| EGDMA | 0.01 | 0 | 0 | 0.00 | 0.00 |
| TAA | 0 | 11.4 | 0 | 0.00 | 0.00 |
| Darocure 1173 | 0.003 | 6.1 | 0 | 0.02 | 0.00 |
| Total | 1 |  |  | 4.80 | 3.36 |

TABLE 20

Example 22

|  | g/g in blend | mmole OH/g comp. | mmole B—O/g comp. | mmole OH/g blend | mmole B—O/g blend |
| --- | --- | --- | --- | --- | --- |
| HEAA | 0 | 8.7 | 0 | 0.00 | 0.00 |
| HEAA-borate | 0.375 | 8.5 | 8.5 | 3.19 | 3.19 |
| SiGMA | 0.562 | 2.4 | 0 | 1.35 | 0.00 |
| EGDMA | 0.01 | 0 | 0 | 0.00 | 0.00 |
| TAA | 0.05 | 11.4 | 0 | 0.57 | 0.00 |
| Darocure 1173 | 0.003 | 6.1 | 0 | 0.02 | 0.00 |
| Total | 1 |  |  | 5.12 | 3.19 |

TABLE 21

Example 23

| | g/g in blend | mmole OH/g comp. | mmole B—O/g comp. | mmole OH/g blend | mmole B—O/g blend |
|---|---|---|---|---|---|
| HEAA | 0 | 8.7 | 0 | 0.00 | 0.00 |
| HEAA-borate | 0.355 | 8.5 | 8.5 | 3.02 | 3.02 |
| SiGMA | 0.532 | 2.4 | 0 | 1.28 | 0.00 |
| EGDMA | 0.01 | 0 | 0 | 0.00 | 0.00 |
| TAA | 0.1 | 11.4 | 0 | 1.14 | 0.00 |
| Darocure 1173 | 0.003 | 6.1 | 0 | 0.02 | 0.00 |
| Total | 1 | | | 5.45 | 3.02 |

TABLE 22

Example 24

| | g/g in blend | mmole OH/g comp. | mmole B—O/g comp. | mmole OH/g blend | mmole B—O/g blend |
|---|---|---|---|---|---|
| HEAA | 0 | 8.7 | 0 | 0.00 | 0.00 |
| HEAA-borate | 0.315 | 8.5 | 8.5 | 2.68 | 2.68 |
| SiGMA | 0.472 | 2.4 | 0 | 1.13 | 0.00 |
| EGDMA | 0.01 | 0 | 0 | 0.00 | 0.00 |
| TAA | 0.2 | 11.4 | 0 | 2.28 | 0.00 |
| Darocure 1173 | 0.003 | 6.1 | 0 | 0.02 | 0.00 |
| Total | 1 | | | 6.11 | 2.68 |

TABLE 23

Example 25

| | g/g in blend | mmole OH/g | mmole B—O/g | mmole OH/g blend | mmole B—O/g blend |
|---|---|---|---|---|---|
| HEAA | 0 | 8.7 | 0 | 0.00 | 0.00 |
| HEAA-borate | 0.275 | 8.5 | 8.5 | 2.34 | 2.34 |
| SiGMA | 0.412 | 2.4 | 0 | 0.99 | 0.00 |
| EGDMA | 0.01 | 0 | 0 | 0.00 | 0.00 |
| TAA | 0.3 | 11.4 | 0 | 3.42 | 0.00 |
| Darocure 1173 | 0.003 | 6.1 | 0 | 0.02 | 0.00 |
| Total | 1 | | | 6.76 | 2.34 |

Example 26-31

Quantified Relationship Between Cure Time and Borate Concentration

A. Formulation A with Borate Diluent

Various blends were prepared as shown in Table 24. D3O-Borate was formed by combining 3 moles D3O with one mole trimethylborate. Methanol was removed using a rotary evaporator at 50° C. under high vacuum for 1 hour, or to constant mass, to yield a new compound, D3O-Borate. The % borate diluent refers to the percent of the total diluent used that is borate diluent. Blend components were added to a vial and rolled on ajar roller for about 24 hours, or until all solids had fully dissolved.

TABLE 24

| Components | Ex. 27 100% Borate Diluent | Ex. 28 75% Borate Diluent | Ex. 29 50% Borate Diluent | Ex. 30 25% Borate Diluent | Ex. 31 0% Borate Diluent |
|---|---|---|---|---|---|
| SiGMA | 21.55%* | 21.55% | 21.55% | 21.55% | 21.55% |
| DMA | 18.46% | 18.46% | 18.46% | 18.46% | 18.46% |
| mPDMS | 23.85% | 23.85% | 23.85% | 23.85% | 23.85% |
| HEMA | 4.62% | 4.62% | 4.62% | 4.62% | 4.62% |
| PVP K90 | 5.38% | 5.38% | 5.38% | 5.38% | 5.38% |
| Norbloc | 1.54% | 1.54% | 1.54% | 1.54% | 1.54% |
| TEGDMA | 1.15% | 1.15% | 1.15% | 1.15% | 1.15% |
| Irgacure 1850 | 0.37% | 0.37% | 0.37% | 0.37% | 0.37% |
| D3O-Borate | 23.08% | 17.31% | 11.54% | 5.77% | 0.00% |
| D3O | 0.00% | 5.77% | 11.54% | 17.31% | 23.08% |
| M % OH | 62.7% | 47.0% | 31.4% | 15.7% | 0% |

*Table values are weight percent

The calculations of grams component/gram blend, mmol OH/g component, mmol B—O/g component, mmol OH/gm blend and mmol B—O/gm blend.

TABLE 25

Example 27

| | g/g in blend | mmole OH/g comp | mmole B—O/g comp | mmole OH/g blend | mmole B—O/g blend |
|---|---|---|---|---|---|
| mPDMS | 0.239 | 0 | 0 | 0.00 | 0.00 |
| HEMA | 0.046 | 7.7 | 0 | 0.35 | 0.00 |
| SiGMA | 0.216 | 2.4 | 0 | 0.52 | 0.00 |
| DMA | 0.185 | 0 | 0 | 0.00 | 0.00 |
| PVP K-90 | 0.054 | 0 | 0 | 0.00 | 0.00 |
| TEGDMA | 0.012 | 0 | 0 | 0.00 | 0.00 |
| Norbloc | 0.015 | 0 | 0 | 0.00 | 0.00 |
| Irgacure 1850 | 0.0037 | 4.5 | 0 | 0.02 | 0.00 |
| D3O | 0 | 6.3 | 0 | 0.00 | 0.00 |
| D3O-borate | 0.231 | 6.2 | 6.2 | 1.43 | 1.43 |
| Total | 1.00 | | | 2.32 | 1.43 |

The lenses of Example 27 had a molar % OH of 61.7%.

TABLE 26

Example 28

| | g/g in blend | mmole OH/g comp. | mmole B—O/g comp. | mmole OH/g blend | mmole B—O/g blend |
|---|---|---|---|---|---|
| mPDMS | 0.239 | 0 | 0 | 0.00 | 0.00 |
| HEMA | 0.046 | 7.7 | 0 | 0.35 | 0.00 |
| SiGMA | 0.216 | 2.4 | 0 | 0.52 | 0.00 |
| DMA | 0.185 | 0 | 0 | 0.00 | 0.00 |
| PVP K-90 | 0.054 | 0 | 0 | 0.00 | 0.00 |
| TEGDMA | 0.012 | 0 | 0 | 0.00 | 0.00 |
| Norbloc | 0.015 | 0 | 0 | 0.00 | 0.00 |
| Irgacure 1850 | 0.0037 | 4.5 | 0 | 0.02 | 0.00 |
| D3O | 0.058 | 6.3 | 0 | 0.37 | 0.00 |
| D3O-borate | 0.173 | 6.2 | 6.2 | 1.07 | 1.07 |
| Total | 1.00 | | | 2.33 | 1.07 |

The lenses of Example 28 had a molar % OH of 46.1%.

TABLE 27

Example 29

| | g/g in blend | mmole OH/g comp | mmole B—O/g comp | mmole OH/g blend | mmole B—O/g blend |
|---|---|---|---|---|---|
| mPDMS | 0.239 | 0 | 0 | 0.00 | 0.00 |
| HEMA | 0.046 | 7.7 | 0 | 0.35 | 0.00 |
| SiGMA | 0.216 | 2.4 | 0 | 0.52 | 0.00 |
| DMA | 0.185 | 0 | 0 | 0.00 | 0.00 |
| PVP K-90 | 0.054 | 0 | 0 | 0.00 | 0.00 |
| TEGDMA | 0.012 | 0 | 0 | 0.00 | 0.00 |
| Norbloc | 0.015 | 0 | 0 | 0.00 | 0.00 |
| Irgacure 1850 | 0.0037 | 4.5 | 0 | 0.02 | 0.00 |
| D3O | 0.115 | 6.3 | 0 | 0.72 | 0.00 |
| D3O-borate | 0.115 | 6.2 | 6.2 | 0.71 | 0.71 |
| Total | 1.00 | | | 2.33 | 0.71 |

The lenses of Example 29 had a molar % OH of 30.6%.

TABLE 28

Example 30

| | g/g in blend | mmole OH/g comp | mmole B—O/g comp | mmole OH/g blend | mmole B—O/g blend |
|---|---|---|---|---|---|
| mPDMS | 0.239 | 0 | 0 | 0.00 | 0.00 |
| HEMA | 0.046 | 7.7 | 0 | 0.35 | 0.00 |
| SiGMA | 0.216 | 2.4 | 0 | 0.52 | 0.00 |
| DMA | 0.185 | 0 | 0 | 0.00 | 0.00 |
| PVP K-90 | 0.054 | 0 | 0 | 0.00 | 0.00 |
| TEGDMA | 0.012 | 0 | 0 | 0.00 | 0.00 |
| Norbloc | 0.015 | 0 | 0 | 0.00 | 0.00 |
| Irgacure 1850 | 0.0037 | 4.5 | 0 | 0.02 | 0.00 |
| D3O | 0.173 | 6.3 | 0 | 1.09 | 0.00 |
| D3O-borate | 0.058 | 6.2 | 6.2 | 0.36 | 0.36 |
| Total | 1.00 | | | 2.34 | 0.36 |

The lenses of Example 30 had a molar % OH of 15.4%.

TABLE 29

Example 31

| | g/g in blend | mmole OH/g comp | mmole B—O/g comp. | mmole OH/g blend | mmole B—O/g blend |
|---|---|---|---|---|---|
| mPDMS | 0.239 | 0 | 0 | 0.00 | 0.00 |
| HEMA | 0.046 | 7.7 | 0 | 0.35 | 0.00 |
| SiGMA | 0.216 | 2.4 | 0 | 0.52 | 0.00 |
| DMA | 0.185 | 0 | 0 | 0.00 | 0.00 |
| PVP K-90 | 0.054 | 0 | 0 | 0.00 | 0.00 |
| TEGDMA | 0.012 | 0 | 0 | 0.00 | 0.00 |
| Norbloc | 0.015 | 0 | 0 | 0.00 | 0.00 |
| Irgacure 1850 | 0.0037 | 4.5 | 0 | 0.02 | 0.00 |
| D3O | 0.231 | 6.3 | 0 | 1.46 | 0.00 |
| D3O-borate | 0 | 6.2 | 6.2 | 0.00 | 0.00 |
| Total | 1.00 | | | 2.34 | 0.00 |

The lenses of Example 31 had a molar % OH of 0%.

Examples 32-33

Formulation with Borate Components and Diluent

A blend of 141 wt. parts trimethylborate, 402 parts D3O, 81 parts HEMA, and 376 parts SiGMA (a mole ratio of 10:19:6:5, respectively) was prepared. Methanol was removed using a rotary evaporator at 50° C. under high vacuum for 1 hour, or to constant mass, to yield a new blend, referred to as SHD-Borate. Two Formulation A blends using SHD-Borate were prepared as described in Table 30. Blend components were added to a vial and rolled on ajar roller for about 24 hours, or until all solids had fully dissolved.

TABLE 30

Blends with Borate Components/Diluent

| Components | Ex. 32-50% Borate Components/Diluent | Ex. 33-100% Borate Components/Diluent |
|---|---|---|
| SHD-Borate | 24.62% | 49.24% |
| SiGMA | 10.77% | 0.00% |
| DMA | 18.47% | 18.47% |
| mPDMS | 23.85% | 23.85% |
| HEMA | 2.31% | 0.00% |
| PVP K90 | 5.38% | 5.38% |
| Norbloc | 1.54% | 1.54% |
| TEGDMA | 1.15% | 1.15% |
| Irgacure 1850 | 0.37% | 0.37% |
| D3O | 11.54% | 0.00% |
| M % OH | 50% | 100% |

*Table values are weight percent

Examples 34-39

Formulations of Examples 34-39 were placed with vial caps removed in a nitrogen filled box for at least 1 hour. Plastic molds were filled in the glove box and placed about three inches under Philips TL03 20 W bulbs for 30 minutes. The lenses were cured in a nitrogen atmosphere at room temperature for 30 minutes. The lenses were leached, first, in a 50% isopropanol: 50% borate buffered saline solution for 30 minutes, then in three cycles of 100% isopropanol for 30 minutes each, next in 50% isopropanol: 50% borate buffered saline solution for 30 minutes, and lastly, in 3 cycles of 100% borate buffered saline solution for 30 minutes each. The lenses from blends 10-15 were clear and the lenses from blend 16 were white.

The cure characteristics for the Formulation A blends described in Tables 7 and 8 were studied using a TA Instruments model Q100 photo-DSC equipped with a universal LED module from Digital Light Labs model number ULM-1-420. Samples were placed on the stage, with nitrogen flushing, and equilibrated at 25° C. for 5 minutes, then 70° C. for 5 minutes, and then photocure was initiated providing 4 mW/cm$^2$. Base curves were plotted using sigmoidal correction. The cure times were calculated using TA Universal Analysis 2000 software. Each blend was tested several times and the values in the table represent the averages of between 2 and 4 runs. The enthalpy, time to peak exotherm, and time to 25, 50, 75, 90, and 95 percent cure are shown in table 9.

The time to various percents cure is calculated by integrating the area under the photo-DSC curve. When the cure is complete the curve returns to the same baseline level as before the cure lamp is turned on. Sometimes the level of this line returns to a level slightly greater or less than the original level. In this case a sigmoidal baseline correction should be applied. A sigmoidal baseline is an s-shaped line that changes in level and/or slope before or after a peak. The baseline is adjusted for the fraction reacted (alpha) versus time. A sigmoidal baseline initially is calculated as a straight line from peak start to peak end. It is then recalculated for each data point between the peak limits as the weighted average between the projected horizontal or tangent baselines at peak start and end. The weighting factors for a given point are: (1) one minus alpha times the initial baseline and (2) alpha times the final baseline. The area is then recalculated with the new baseline. If the new area differs from the previous area by more than one percent, the area is recalculated and the sigmoidal curve shifted repeatedly until two consecutive calculations of the area differ by no more than one percent. The software used to generate the data below was Universal Analysis 2000 for Windows 2000/XP/Vista, Version 4.5A, Build 4.5.0.5, but DSC instruments from various manufacturers typically have equivalent sigmoidal baseline correcting capabilities.)

TABLE 31

Formulation A Borate Photo-DSC Results

| Ex. # | Cure Averages | Time to Peak (min) | Enthalpy (J/g) | Time to 25% Cure (min) | Time to 50% Cure (min) | Time to 75% Cure (min) | Time to 90% Cure (min) | Time to 95% Cure (min) |
|---|---|---|---|---|---|---|---|---|
| 34 | 0% D3O-Borate | 0.75 | 136.80 | 0.62 | 1.18 | 1.75 | 2.29 | 2.74 |
| 35 | 25% D3O-Borate | 1.06 | 128.33 | 0.58 | 1.04 | 1.50 | 1.94 | 2.27 |
| 36 | 50% D3O-Borate | 0.91 | 113.70 | 0.55 | 0.92 | 1.31 | 1.70 | 2.02 |
| 37 | 75% D3O-Borate | 0.89 | 131.70 | 0.54 | 0.88 | 1.23 | 1.59 | 1.87 |
| 38 | 100% D3O-Borate | 0.80 | 136.40 | 0.50 | 0.80 | 1.10 | 1.42 | 1.69 |
| 39 | 50% SHD-Borate | 0.72 | 150.70 | 0.43 | 0.70 | 0.96 | 1.20 | 1.35 |

These results show that by adding an increasing amount of the D3O-borate diluent, the cure time is reduced. It also shows that by adding borate to both the components and the diluent (Example 39 50% SHD-borate), an even faster cure can be achieved. Comparing the values at 95% cure, the 50% SHD-borate samples (Example 39) decreases the cure time by slightly more than 50 percent and the 100% borate diluent sample (Example 38) decreases cure time by about 38 percent.

Lenses were submitted for Dk, DCA, water content and mechanicals testing to determine if the addition of borate had any adverse effects on lens properties. These results, given in Table 32, show that borate has little or no effect on these lens properties.

The addition of borate to the Formulation A blend decreased cure time by up to 50% without adversely affecting the lens properties.

Example 40-43

Formulation B-Borate

A: Formulation B with Borate Diluent.

TPME-borate was formed by combining three moles TPME with one mole trimethylborate. Methanol was removed using a rotary evaporator at 50° C. under high vacuum for 1 hour, or to constant mass to yield a new compound, TPME-Borate. Various blends were prepared as described in Table 11. Several Formulation B blends using TPME-Borate were prepared as described in Table 11. Decanoic acid is from KIC Chemicals Inc. The % borate diluent refers to the percent of the total hydroxyl-functional diluent used that is introduced as a borate. Blend components were added to a vial and rolled on ajar roller until all solids had fully dissolved.

TABLE 32

Formulation A-Borate Lens Characteristics

| Lens Characteristics | Ex. 34- 100% Borate Diluent | Ex 35- 75% Borate Diluent | Ex 36- 50% Borate Diluent | Ex. 37- 25% Borate Diluent | Ex. 38- 0% Borate Diluent | Ex. 39- 50% Borate Components/ Diluent |
|---|---|---|---|---|---|---|
| Water Content (%) | 38 ± 0.2 | 37 ± 0.2 | 37 ± 0.4 | 37 ± 0.2 | 38 ± 0.2 | 38 ± 0.2 |
| Dk (barrers) | 109 | 106 | 113 | 112 | 111 | 107 |
| Modulus (psi) | 105 ± 10 | 104 ± 11 | 98 ± 2 | 105 ± 9 | 93 ± 7 | 96 ± 7 |
| Elongation (%) | 210 ± 53 | 258 ± 55 | 239 ± 56 | 219 ± 52 | 248 ± 60 | 260 ± 51 |
| Tensile Strength (psi) | 106 ± 26 | 129 ± 22 | 116 ± 30 | 112 ± 29 | 114 ± 34 | 130 ± 39 |
| Toughness (in#/in^3) | 121 ± 48 | 168 ± 53 | 147 ± 61 | 131 ± 52 | 149 ± 67 | 169 ± 67 |
| DCA | 61 ± 11 | 60 ± 9 | 54 ± 14 | 73 ± 10 | 75 ± 10 | 101 ± 11 |

TABLE 33

Formulation B Blends with Borate Diluent

| Component | Ex. 40 -0% Borate Diluent | Ex. 41- 50% Borate Diluent | Ex. 42- 75% Borate Diluent | Ex. 43- 100% Borate Diluent |
| --- | --- | --- | --- | --- |
| OH-mPDMS | 30.26% | 30.26% | 30.26% | 30.26% |
| DMA | 10.74% | 10.74% | 10.74% | 10.74% |
| HEMA | 4.40% | 4.40% | 4.40% | 4.40% |
| TPME-Borate | 0.00% | 12.40% | 18.54% | 24.74% |
| TPME | 24.74% | 12.34% | 6.20% | 0.00% |
| Decanoic acid | 20.26% | 20.26% | 20.26% | 20.26% |
| TEGDMA | 1.65% | 1.65% | 1.65% | 1.65% |
| PVP K90 | 6.60% | 6.60% | 6.60% | 6.60% |
| Norbloc | 1.21% | 1.21% | 1.21% | 1.21% |
| Irgacure 819 | 0.14% | 0.14% | 0.14% | 0.14% |
| M % OH | 0% | 29.5% | 44.3% | 59.1% |

*Table values are weight percent

Formulation B blends of Examples 40-43 were placed with vial caps removed in a nitrogen filled box for at least 1 hour. Plastic molds were filled in the glove box and placed about three inches under Philips TL03 20 W bulbs for 30 minutes. The lenses were cured in a nitrogen atmosphere at room temperature for 30 minutes. The lenses were then leached, first, in a 50% isopropanol: 50% borate buffered saline solution for 30 minutes, then in 3 cycles of 100% borate buffered saline solution for 30 minutes each. The lenses from these blends were clear.

The cure characteristics for the Formulation B blends described in Table 34 were studied using a TA Instruments model Q100 photo-DSC as in example 3. The enthalpy, time to cure, and time to 25, 50, 75, 90, and 95 percent cure are shown in Table 35. Each blend was tested several times and the values in the table represent the averages of between 2 and 4 runs.

TABLE 34

Formulation B Borate Photo-DSC Results

| Cure Ex Averages | Time to Peak (min) | Enthalpy (J/g) | Time to 25% Cure (min) | Time to 50% Cure (min) | Time to 75% Cure (min) | Time to 90% Cure (min) | Time to 95% Cure (min) |
| --- | --- | --- | --- | --- | --- | --- | --- |
| 40 0% TPME-Borate | 0.32 | 106.47 | 0.60 | 1.25 | 2.15 | 3.16 | 3.93 |
| 41 50% TPME-Borate | 0.32 | 110.73 | 0.60 | 1.19 | 1.94 | 2.82 | 3.51 |
| 42 75% TPME-Borate | 0.36 | 104.60 | 0.57 | 1.10 | 1.75 | 2.53 | 3.19 |
| 43 100% TPME-Borate | 0.74 | 100.30 | 0.54 | 1.02 | 1.59 | 2.31 | 2.93 |

These results show that by adding an increasing amount of the TPME-borate diluent, the cure time is reduced. Comparing the values at 95% cure, Example 43 (100% TPME-borate) decreases the cure time by slightly more than 25 percent compared to Example 40.

Lenses were submitted for Dk, DCA, water content and mechanicals testing to determine if the addition of borate had any adverse effects on lens properties. These results, given in Table 35, show that borate has little or no effect on these lens properties.

TABLE 35

Formulation B-Borate Lens Characteristics

| Lens Characteristics | Ex. 40- 0% Borate Diluent | Ex. 41- 50% Borate Diluent | Ex. 42- 75% Borate Diluent | Ex. 43- 100% Borate Diluent |
| --- | --- | --- | --- | --- |
| Water Content (%) | 43 ± 0.1 | 43 ± 0.2 | 43 ± 0.2 | 45 ± 0.5 |
| Dk (barrers) | 93 | 91 | 93 | 94 |
| Modulus (psi) | 103 ± 7 | 117 ± 9 | 110 ± 9 | 97 ± 6 |
| Elongation (%) | 225 ± 46 | 216 ± 45 | 223 ± 64 | 211 ± 74 |
| Tensile Strength (psi) | 104 ± 20 | 115 ± 25 | 113 ± 30 | 99 ± 34 |
| Toughness (in#/in³) | 132 ± 44 | 138 ± 52 | 143 ± 61 | 122 ± 70 |
| DCA | 57 ± 12 | 70 ± 10 | 55 ± 7 | 63 ± 11 |

By adding borate to the Formulation B blend we were able to achieve up to a 25% reduction in cure time without adversely affecting the lens properties.

Example 44-47

Formulation B with Borate Components and No Diluent

A blend of 77 parts trimethylborate, 805 parts OH-mPDMS and 118 parts HEMA (a mole ratio of 10:18:12 respectively) was prepared. Methanol was removed using a rotary evaporator at 50° C. under high vacuum for 1 hour, or to constant mass, to yield a new borate blend referred to as OHH-Borate. Several no diluent Formulation B blends using OHH-Borate were prepared as described in Table 36. Blend components were added to a vial and rolled on a jar roller until all solids had fully dissolved.

TABLE 36

Formulation B Blend with Borate Components

| Component | Ex. 44- 0% Borate Components | Ex. 45- 50% Borate Components | Ex. 46- 75%% Borate Components | Ex. 47- 100% Borate Components |
| --- | --- | --- | --- | --- |
| OH-mPDMS | 55.0% | 27.5% | 13.7% | 0.0% |
| HEMA | 8.0% | 4.0% | 2.0% | 0.0% |
| OHH-Borate | 0.0% | 31.5% | 47.3% | 63% |
| DMA | 19.5% | 19.5% | 19.5% | 19.5% |

TABLE 36-continued

Formulation B Blend with Borate Components

| Component | Ex. 44-<br>0%<br>Borate<br>Components | Ex. 45-<br>50%<br>Borate<br>Components | Ex. 46-<br>75%%<br>Borate<br>Components | Ex. 47-<br>100%<br>Borate<br>Components |
|---|---|---|---|---|
| TEGDMA | 3.0% | 3.0% | 3.0% | 3.0% |
| PVP K90 | 12.0% | 12.0% | 12.0% | 12.0% |
| Norbloc | 2.2% | 2.2% | 2.2% | 2.2% |
| Irgacure 819 | 0.3% | 0.3% | 0.3% | 0.3% |

*Table values are weight percent

Formulation blends from Examples 44-47 were placed with vial caps removed in a nitrogen filled box for at least 1 hour. Plastic molds were filled in the glove box and placed about three inches under Philips TL03 20 W bulbs for 30 minutes. The lenses were cured in a nitrogen atmosphere at room temperature for 30 minutes. The lenses were then leached, first, in a 50% isopropanol: 50% borate buffered saline solution for 30 minutes, then in 3 cycles of 100% borate buffered saline solution for 30 minutes each. The lenses from these blends were clear.

The cure characteristics for the Formulation B blends described in Table 36 were studied using a TA Instruments model Q100 photo-DSC as in example 3. The enthalpy, time to cure, and time to 25, 50, 75, 90, and 95 percent cure are shown in Table 37, below. Each blend was tested in several times and the values in the Table represent the averages of between 2 and 4 runs.

TABLE 37

No Diluent Formulation B Borate Photo-DSC Results

| Cure<br>Ex Averages | Time to<br>Peak (min) | Enthalpy<br>(J/g) | Time to<br>25% Cure<br>(min) | Time to<br>50% Cure<br>(min) | Time to<br>75% Cure<br>(min) | Time to<br>90% Cure<br>(min) | Time to<br>95% Cure<br>(min) |
|---|---|---|---|---|---|---|---|
| 44 0% OHH-Borate | 0.52 | 174.05 | 0.33 | 0.49 | 0.65 | 0.81 | 0.93 |
| 45 50% OHH-Borate | 0.38 | 200.60 | 0.27 | 0.38 | 0.50 | 0.63 | 0.74 |
| 46 75% OHH-Borate | 0.39 | 206.17 | 0.27 | 0.39 | 0.51 | 0.65 | 0.77 |
| 47 100% OHH-Borate | 0.41 | 178.30 | 0.29 | 0.43 | 0.57 | 0.74 | 0.90 |

These results show that the addition of borate reduces the time to cure.

Lenses were submitted for DK, DCA, water content and mechanicals testing to determine if the addition of borate had any adverse effects on lens properties. These results, given in Table 16, show that borate has little or no effect on these lens properties.

TABLE 38

No Diluent Formulation B-Borate Lens Characteristics

| Lens<br>Characteristics | Ex 44-<br>0%<br>Borate<br>Components | Ex 45-<br>50%<br>Borate<br>Components | Ex 46-<br>75%%<br>Borate<br>Components | Ex 47-<br>100%<br>Borate<br>Components |
|---|---|---|---|---|
| Water Content (%) | 34 ± 0.4 | 36 ± 0.3 | 33 ± 0.1 | 36 ± 0.1 |
| DK (barrers) | 100 | 99 | 98 | 94 |
| Modulus (psi) | 304 ± 27 | 263 ± 31 | 304 ± 30 | 248 ± 33 |
| Elongation (%) | 98 ± 24 | 111 ± 26 | 102 ± 30 | 121 ± 36 |
| Tensile Strength (psi) | 145 ± 31 | 136 ± 28 | 154 ± 37 | 141 ± 32 |
| Toughness (in#/in^3) | 82 ± 38 | 84 ± 33 | 91 ± 46 | 95 ± 51 |
| DCA | 93 ± 8 | 94 ± 3 | 101 ± 5 | 107 ± 7 |

The addition of borate to the no diluent Formulation B blend reduced cure time without adversely affecting the lens properties.

Dynamic Mechanical Analysis

Figure 4:
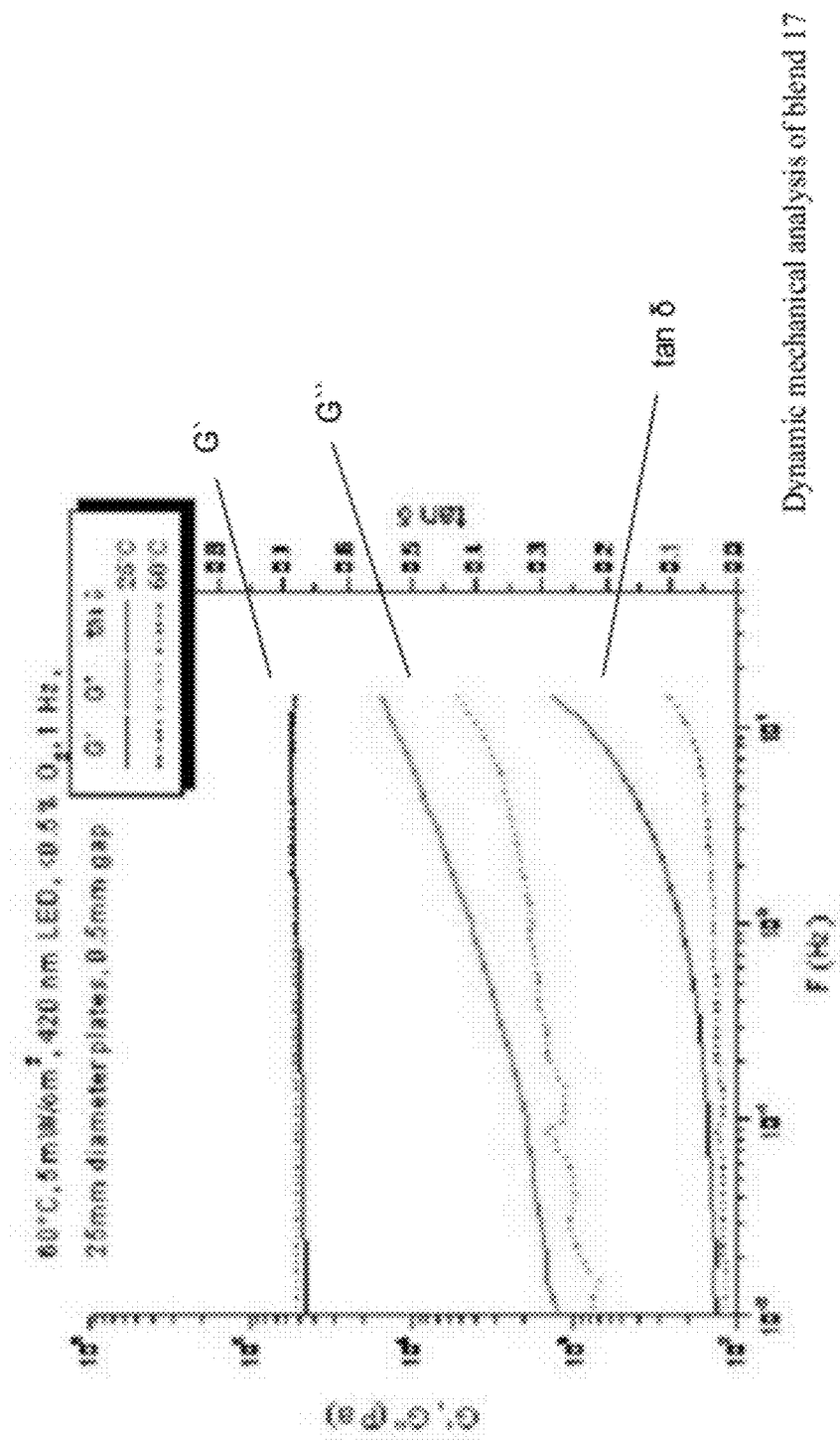
FIG. 4 is a dynamic mechanical analysis of blend 17.
Figure 5:
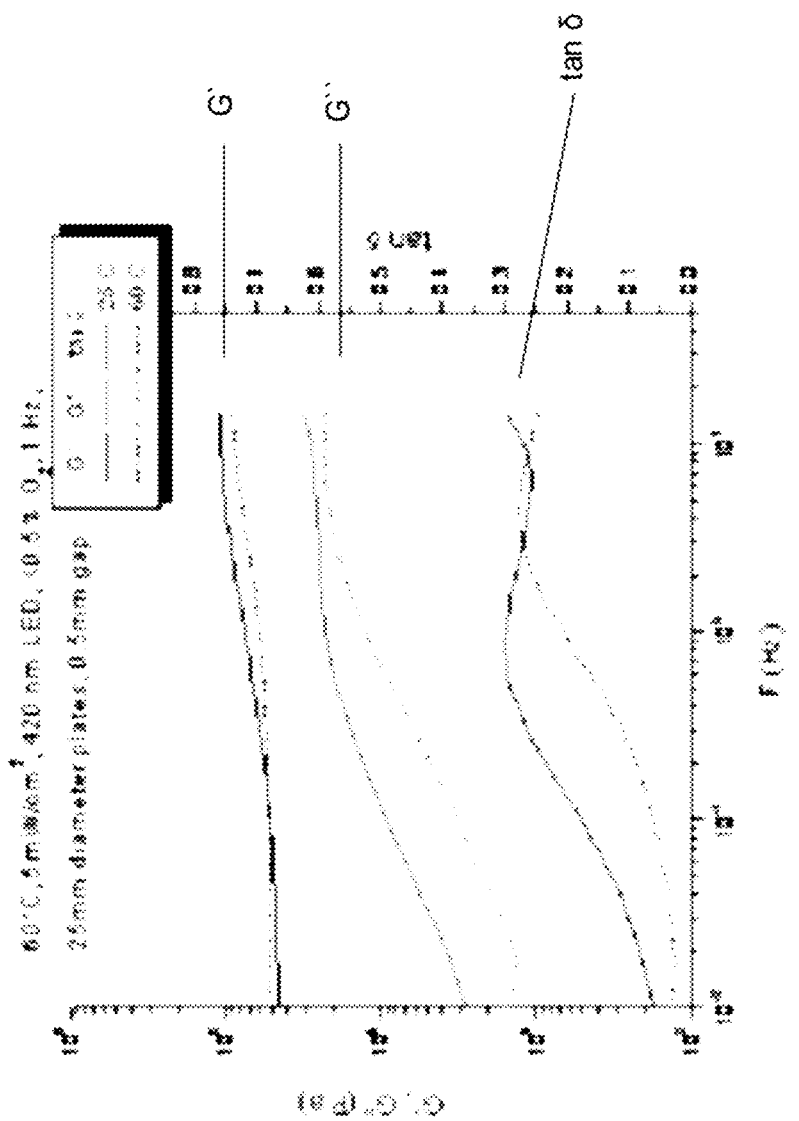
FIG. 5 is a dynamic mechanical analysis of blend 20.

Blends 17 (borate free control) and 20 (with borate) were tested using dynamic mechanical analysis. The results in FIGS. 4 and 5 show that the modulus of material made by curing a borate containing blend is higher than the modulus made with the same blend made without borate. The details of the testing protocols follows.

The photo-polymerization reaction was monitored with an ATS StressTech rheometer [ATS RheoSystems, 52 Georgetown Road, Bordentown, N.J. 08505] equipped with a photo-curing accessory, which consisted of a temperature-controlled cell with a quartz lower plate and an aluminum upper plate, and a 420 nm LED array [EXFO Photonic Solutions Inc., 2260 Argentia Rd., Mississauga, ON L5N 6H7 CANADA] situated beneath the quartz plate. The intensity of the radiation, measured at the surface of the quartz window with an IL1400A radiometer and XRL140A sensor [International Light, Inc., 17 Graf Road, Newburyport, Mass. 01950], was regulated at 5.0±0.1 mW/cm$^2$ with an electronic controller [Andover Corporation, 4 Commercial Drive, Salem, N.H. 03079-2800 USA]. The temperature was controlled at 60.0±0.1° C.

After approximately 0.25 mL of the reactive component mix was placed on the lower plate of the rheometer, the 25 mm diameter upper plate was lowered to 0.500±0.001 mm above the lower plate, where it was held until after the reaction reached the gel point. The sample was allowed to reach thermal equilibrium (~5 minutes, determined by the leveling-off of the steady shear viscosity of the sample as it warmed up) before the LED array was turned on and the reaction begun. During this time, while the sample was reaching thermal equilibrium, the sample chamber was purged with nitrogen gas at a rate of 400 sccm. After this initial purge the oxygen level in the sample chamber was monitored at 0.2±0.1% with a CheckPoint O$_2$ sensor [PBI Dansensor, available from Topac, 101 Derby St., #203

Hingham, Mass. 02043]. During the reaction the rheometer continuously monitored the strain resulting from an applied dynamic stress (fast oscillation mode), where time segments of less than a complete cycle were used to measure the strain at the applied sinusoidal stress (applied at a frequency of 1.0 Hz). The dynamic shear modulus (G'), loss modulus (G"), and gap height were monitored as a function of exposure time. As the reaction proceeded the shear modulus increased from <1 Pa to >0.1 MPa, and tan δ (=G"/G') dropped from near infinity to less than 1. For many reactive crosslinking systems the gel point is defined as the time at which tan δ=1 (the crossover point when G'=G"). At the time that G' reached 100 Pa (shortly after the gel point), the restriction of the gap height on the upper plate was removed (Autotension Mode: Tension=0) so that the gap between the upper and lower plates could change as the reactive component mix shrank during cure, and the stress due to shrinkage was kept at a minimum. A measurement of the change in gap provides an estimate of the amount of shrinkage caused by the polymerization reaction.

After a 10-minute exposure the LED array was turned off (i.e., the cure was terminated), and a temperature sweep was run on the cured film between the parallel plates of the rheometer. The temperature was ramped from 60° C. to 25° C. (1° C./min) at a frequency of 1.0 Hz and a shear stress of 3000 Pa to determine the glass transition temperature (Tg), subsequently heating from 25° C. to 120° C. and then cooling from 120° C. to 25° C. to observe any changes that may be caused by heating above the cure temperature, all at a frequency of 1 Hz, stress of 3000 Pa, and temperature change of 1° C./min.

Frequency sweeps from 0.01 Hz to 40 Hz at a shear stress of 1000 Pa were run at 60° C. and at 25° C. on the cured films to obtain mechanical property spectra.

What is claimed is:

1. A method of forming a silicone hydrogel material comprising the steps of:
providing a mixture of polymerizable components that includes at least one hydrophilic component and at least one silicone component, wherein at least one of the polymerizable components contains a hydroxyl group, the mixture further including a sufficient amount of a borate to reduce cure time compared to an identical mixture that lacks the borate, the borate being selected from either boric anhydride or a borate represented by formula:

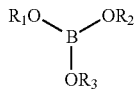

where wherein $R_1$, $R_2$ and $R_3$ are independently selected from the group consisting of hydrogen; C1-C16 alkyl groups; C1-C16 alkyl groups substituted with O, Cl, N, or Br; polymerizable groups; ester groups, amide groups, ether groups, silicone components and hydrophilic components, with the proviso that $R_1$, $R_2$, and $R_3$ comprise at most one hydroxyl group;
curing the mixture to form a cured material.

2. The method as recited in claim 1, wherein $R_1$, $R_2$ and $R_3$ are monovalent.

3. The method as recited in claim 1, wherein at least two of $R_1$, $R_2$ and $R_3$ are divalent and, taken together, form a cyclic borate ester.

4. The method as recited in claim 1, wherein at least one of $R_1$, $R_2$ and $R_3$ comprises a polymerizable group.

5. The method as recited in claim 1, wherein $R_1$, $R_2$ and $R_3$ are the same.

6. The method as recited in claim 1, wherein the borate is selected from the group consisting of a borate ester of methanol, ethanol, propanol, t-amyl alcohol, 3-methyl-3-pentanol, 3,7-dimethyl-3-octanol, 2-hydroxyethylmethacrylate, tri(propylene glycol) methyl ether, 2-propenoic acid, 2-methyl-,2-hydroxy-3-[3-[1,3,3,3-tetramethyl-1-[(trimethylsilyl)oxy]disiloxanyl]propoxy]propyl ester (SiGMA), mono-(3-methacryloxy-2-hydroxypropyloxy)propyl terminated, mono-butyl terminated polydimethylsiloxane (OHm-PDMS); and combinations thereof.

7. The method as recited in claim 5, wherein $R_1$, $R_2$ and $R_3$ are selected from the group consisting of n-propyl, iso-propyl, butyl and tert-butyl.

8. The method as recited in claim 1, wherein the borate is selected from the group consisting of trimethyl borate and triethyl borate.

9. The method as recited in claim 1, wherein the borate is boric acid.

10. The method as recited in claim 1, wherein the step of curing the mixture has a borate content of between 2 M % OH and 50 M % OH.

11. The method as recited in claim 1, wherein the mixture has a viscosity that is at least 10% greater than that of the identical mixture that lacks the borate.

12. The method as recited in claim 1, further comprising the step of removing at least half of the borate from the cured contact lens material.

13. The method as recited in claim 1, wherein the cure time is reduced by at least 10% relative to the identical mixture that lacks the borate.

14. The method as recited in claim 1, wherein the cure time is reduced by at least 25% relative to the identical mixture that lacks the borate.

15. The method as recited in claim 1, wherein the cure time is reduced by at least 50% relative to the identical mixture that lacks the borate.

16. A method of forming an optically clear material comprising the steps of:
providing a mixture of polymerizable components that includes at least one hydrophilic component and at least one silicone component wherein at least one of the polymerizable components contains a hydroxyl group, the mixture further including a sufficient amount of a borate to render the resulting cured material more optically clear compared to a cured material formed from an identical mixture that lacks the borate, the borate being selected from either boric anhydride or a borate represented by formula:

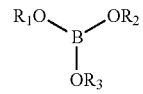

wherein $R_1$, $R_2$, and $R_3$ are independently selected from the group consisting of hydrogen; C1-C16 alkyl groups; C1-C16 alkyl groups substituted with O, Cl, N, or Br; polymerizable groups; ester groups, amide groups, ether groups, silicone components and hydrophilic components, with the proviso that $R_1$, $R_2$, and $R_3$ comprise at most one hydroxyl group;
curing the mixture to form a cured, optically clear material.

* * * * *